US012647191B2

(12) United States Patent　(10) Patent No.:　US 12,647,191 B2
Akita et al.　(45) Date of Patent:　Jun. 2, 2026

(54) ELECTRONIC APPARATUS, ELECTRONIC SYSTEM, METHOD, AND COMPUTER READABLE MEDIUM

(71) Applicant: KABUSHIKI KAISHA TOSHIBA, Tokyo (JP)

(72) Inventors: Koji Akita, Yokohama Kanagawa (JP); Tomoya Tandai, Ota Tokyo (JP); Miyuki Ogura, Tachikawa Tokyo (JP); Ryoko Matsuo, Shinagawa Tokyo (JP); Kohei Onizuka, Shinagawa Tokyo (JP); Toshihisa Nabetani, Kawasaki Kanagawa (JP)

(73) Assignee: KABUSHIKI KAISHA TOSHIBA, Kawasaki (JP)

( * ) Notice: Subject to any disclaimer, the term of this patent is extended or adjusted under 35 U.S.C. 154(b) by 946 days.

(21) Appl. No.: 17/473,272

(22) Filed: Sep. 13, 2021

(65) Prior Publication Data

US 2022/0137598 A1　May 5, 2022

(30) Foreign Application Priority Data

Oct. 30, 2020　(JP) ................................. 2020-182913

(51) Int. Cl.
　*G05B 19/4155*　(2006.01)
　*H04B 17/309*　(2015.01)

(52) U.S. Cl.
　CPC ....... *H04B 17/309* (2015.01); *G05B 19/4155* (2013.01); *G05B 2219/33243* (2013.01)

(58) Field of Classification Search
　CPC ...... G05B 19/4155; G05B 2219/33243; H04B 17/309; H04B 17/26; H04B 17/27; H04B 17/318
　See application file for complete search history.

(56) References Cited

U.S. PATENT DOCUMENTS

2006/0244627 A1 　11/2006　Kagermeier et al.
2007/0063834 A1* 　3/2007　Bozzone ............... H04L 67/125
　340/539.1

(Continued)

FOREIGN PATENT DOCUMENTS

JP　2007509638 A　4/2007
JP　4519131 B2　5/2010

(Continued)

OTHER PUBLICATIONS

U.S. Appl. No. 17/193,984; First Named Inventor: Koji Akita; Title: "Electronic Apparatus, Control Target Apparatus, Electronic System, Method, and Computer Program"; filed Mar. 5, 2021.

(Continued)

*Primary Examiner* — Charles R Kasenge
(74) *Attorney, Agent, or Firm* — Holtz, Holtz & Volek PC

(57)　ABSTRACT

An electronic apparatus instructs an operation of at least a part of a control target device via wireless communication. The electronic apparatus includes a processor configured to acquire communication quality information of the wireless communication between the electronic apparatus and the control target device, acquire first information indicating a degree of a risk that can be caused by the operation, and generate a control signal instructing the operation based on the communication quality information and the first information.

12 Claims, 22 Drawing Sheets

(56)  References Cited

U.S. PATENT DOCUMENTS

| | | | | | |
|---|---|---|---|---|---|
| 2013/0297069 | A1* | 11/2013 | Tachiwa | ............... | G05B 19/052 |
| | | | | | 700/245 |
| 2016/0271794 | A1 | 9/2016 | Inaba | | |
| 2019/0092176 | A1* | 3/2019 | Uyeki | .................. | B60L 53/665 |
| 2019/0122455 | A1* | 4/2019 | Howard | ................. | G07C 5/085 |
| 2019/0265705 | A1* | 8/2019 | Zhang | .................. | G05D 1/644 |
| 2020/0068584 | A1 | 2/2020 | Matsuki et al. | | |
| 2020/0187083 | A1 | 6/2020 | Shimizu et al. | | |
| 2020/0365039 | A1 | 11/2020 | Yamada et al. | | |
| 2021/0088997 | A1 | 3/2021 | Kogawa et al. | | |
| 2022/0076557 | A1 | 3/2022 | Akita et al. | | |

FOREIGN PATENT DOCUMENTS

| | | | | | |
|---|---|---|---|---|---|
| JP | 2016175145 | A | 10/2016 | | |
| JP | 2017046491 | A | 3/2017 | | |
| JP | 2018093403 | A | 6/2018 | | |
| JP | 2019022089 | A | 2/2019 | | |
| JP | 2022044270 | | 3/2022 | | |
| WO | 2005018242 | A2 | 2/2005 | | |
| WO | 2019098017 | A1 | 5/2019 | | |
| WO | WO-2019133048 | A1 * | 7/2019 | ........... | H04B 17/318 |

OTHER PUBLICATIONS

Japanese Decision to Grant a Patent (and an English language translation thereof) dated Jul. 2, 2024, issued in counterpart Japanese Application No. 2020-182913.

* cited by examiner

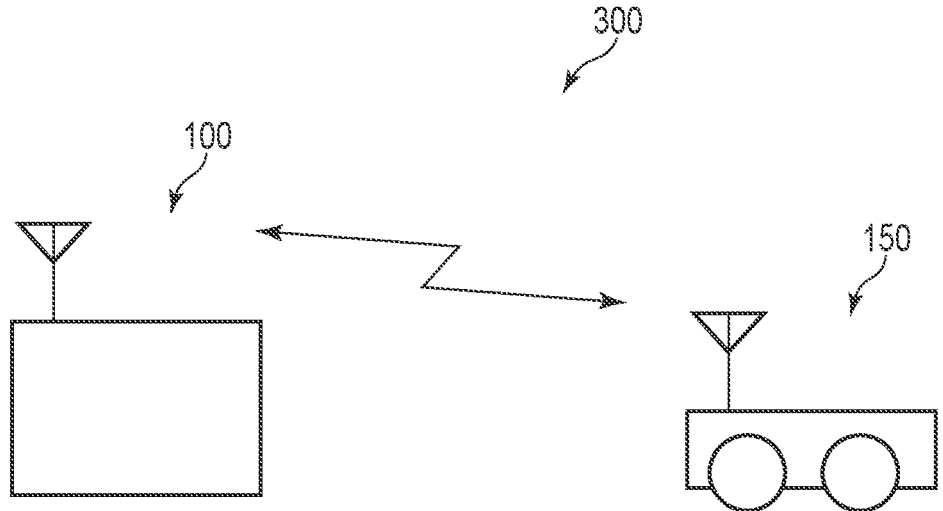
F I G. 1

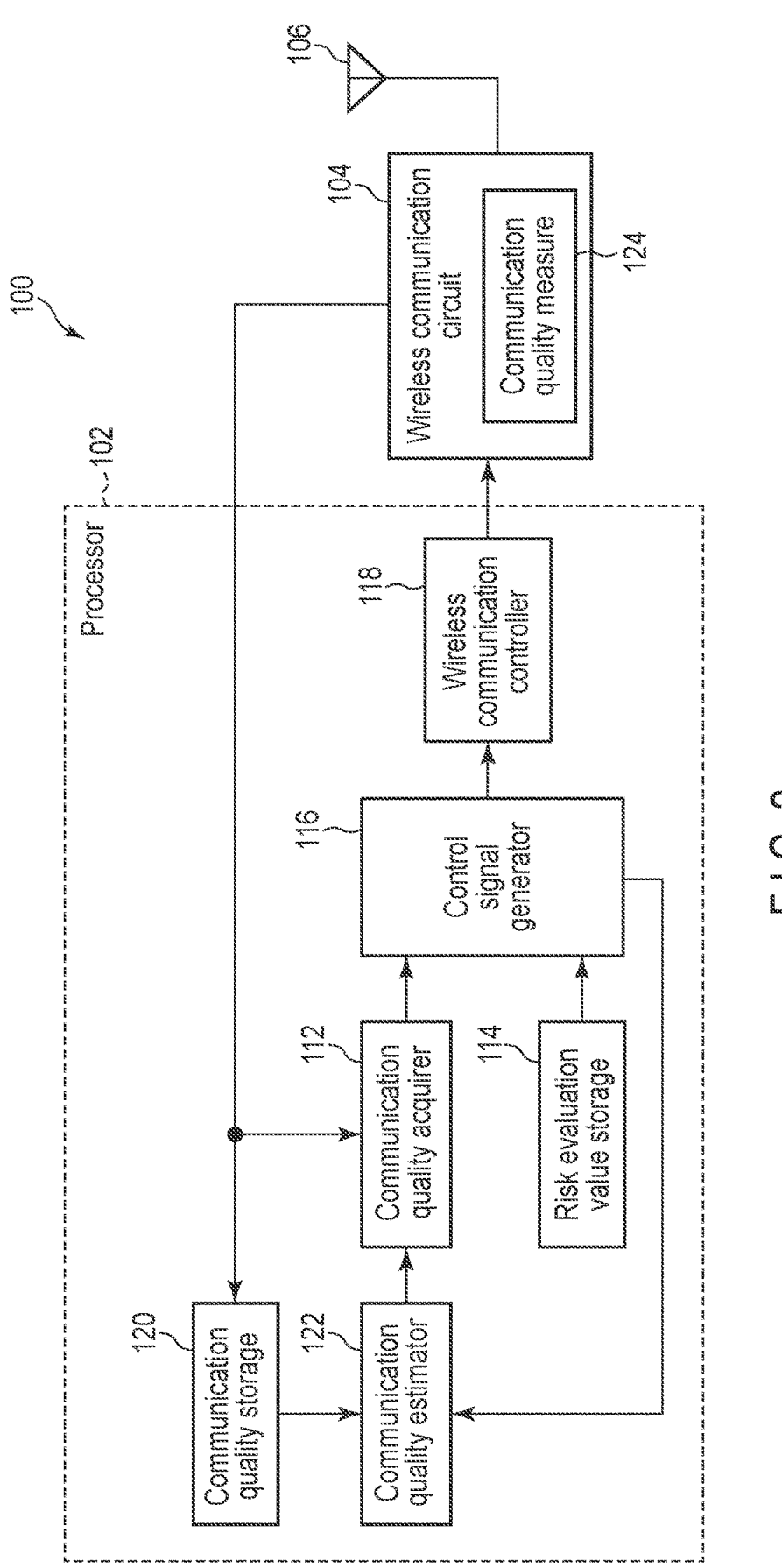
F I G. 2

| Operation type | Risk type | | | | | | | | | | | |
| --- | --- | --- | --- | --- | --- | --- | --- | --- | --- | --- | --- | --- |
| | Peripheral collision | | Collision with another device | | Load damage | | Rollover | | Incomplete operation | | Isolation | |
| | Risk infor-mation | Occurrence frequency (%) | Risk infor-mation | Occurrence frequency (%) | Risk infor-mation | Occurrence frequency (%) | Risk infor-mation | Occurrence frequency (%) | Risk infor-mation | Occurrence frequency (%) | Risk infor-mation | Occurrence frequency (%) |
| Loading | N/A | N/A | N/A | N/A | ** | ** | N/A | N/A | ** | ** | ** | ** |
| Unloading | N/A | N/A | N/A | N/A | ** | ** | N/A | N/A | ** | ** | ** | ** |
| Conveying load through wide passage from point A to point B | ** | ** | ** | ** | ** | ** | ** | ** | ** | ** | ** | ** |
| Conveying load through narrow passage from point A to point B | ** | ** | ** | ** | ** | ** | ** | ** | ** | ** | ** | ** |
| Going around in warehouse and temporarily stopping at points A, B, and C | ** | ** | ** | ** | ** | ** | ** | ** | ** | ** | ** | ** |

F I G. 5A

| Operation type | Risk type | | | | | | | | | | | |
| --- | --- | --- | --- | --- | --- | --- | --- | --- | --- | --- | --- | --- |
| | Peripheral collision | | Collision with another device | | Load damage | | Rollover | | Incomplete operation | | Isolation | |
| | Risk infor-mation | Occurrence frequency (%) | Risk infor-mation | Occurrence frequency (%) | Risk infor-mation | Occurrence frequency (%) | Risk infor-mation | Occurrence frequency (%) | Risk infor-mation | Occurrence frequency (%) | Risk infor-mation | Occurrence frequency (%) |
| Going straight by 2 meters | ** | ** | ** | ** | ** | ** | ** | ** | ** | ** | ** | ** |
| Turning right | ** | ** | ** | ** | ** | ** | ** | ** | ** | ** | ** | ** |
| Going straight by 3 meters and stop | ** | ** | ** | ** | ** | ** | ** | ** | ** | ** | ** | ** |
| Passing behind product | ** | ** | ** | ** | ** | ** | ** | ** | ** | ** | ** | ** |
| Gripping load | ** | ** | ** | ** | ** | ** | N/A | N/A | ** | ** | N/A | N/A |
| Conveying load in cooperation with another device | ** | ** | ** | ** | ** | ** | ** | ** | ** | ** | ** | ** |
| Moving to charging station | ** | ** | ** | ** | ** | ** | ** | ** | ** | ** | ** | ** |
| Rotating at least part of AGV or robot | ** | ** | ** | ** | ** | ** | ** | ** | ** | ** | ** | ** |

F I G. 5B

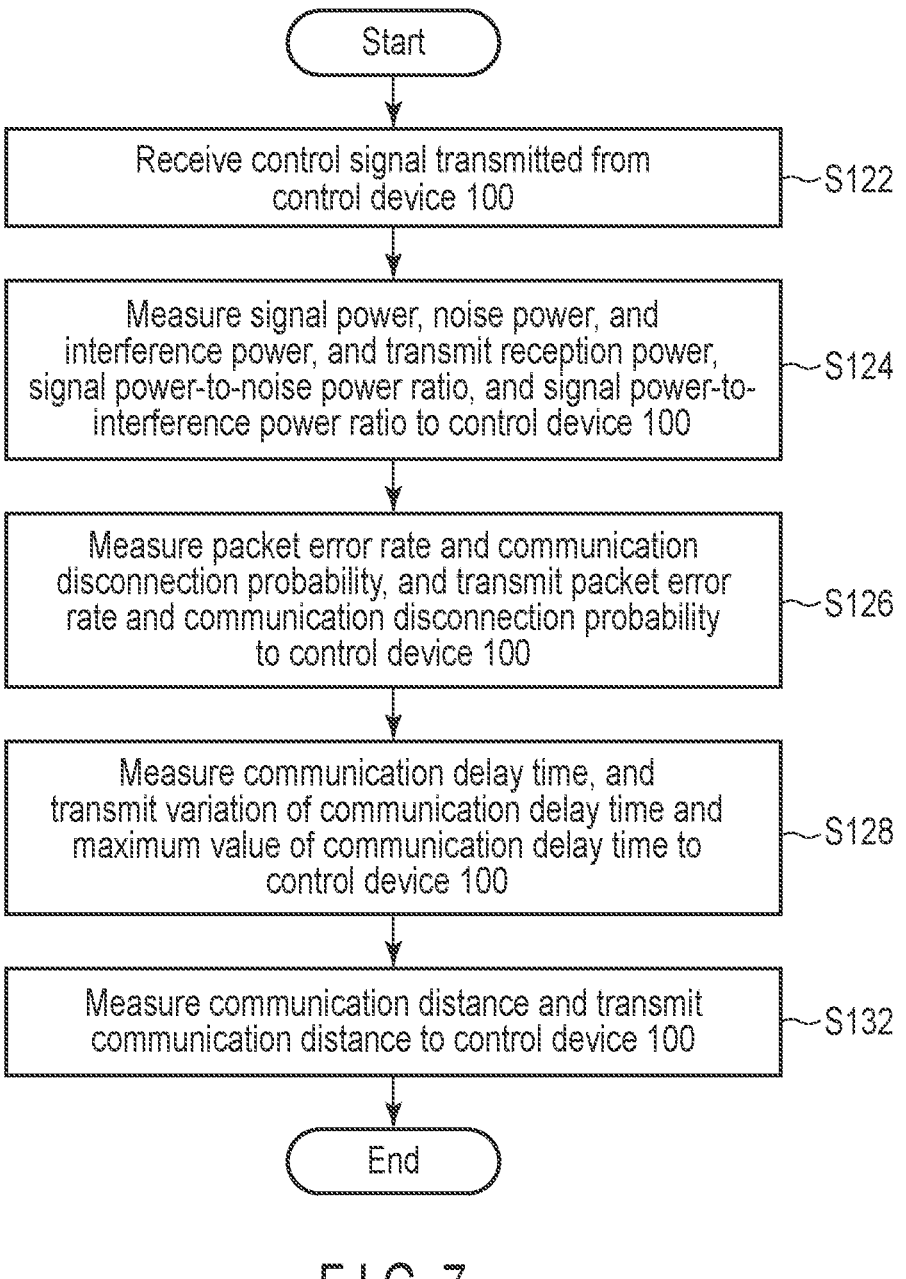

Start

Receive control signal transmitted from
control device 100 ~S122

Measure signal power, noise power, and
interference power, and transmit reception power,
signal power-to-noise power ratio, and signal power-to-
interference power ratio to control device 100 ~S124

Measure packet error rate and communication
disconnection probability, and transmit packet error
rate and communication disconnection probability
to control device 100 ~S126

Measure communication delay time, and
transmit variation of communication delay time and
maximum value of communication delay time to
control device 100 ~S128

Measure communication distance and transmit
communication distance to control device 100 ~S132

End

F I G. 7

| Control target device | Communication quality | | | | | | | | |
| | Reception power | Signal power-to-noise power ratio | Signal power-to-interference power ratio | Communication distance | Packet error rate | Variation of communication delay time | Maximum value of communication delay time | Communication disconnection probability | Arithmetic value |
| Device A | P1a | P2a | P3a | Da | PRa | DVa | DMa | DRa | ARa |
| Device B | P1b | P2b | P3b | Db | PRb | DVb | DMb | DRb | ARb |
| Device C | P1c | P2c | P3c | Dc | PRc | DVc | DMc | DRc | ARc |
| ... | ... | ... | ... | ... | ... | ... | ... | ... | ... |

F I G. 8

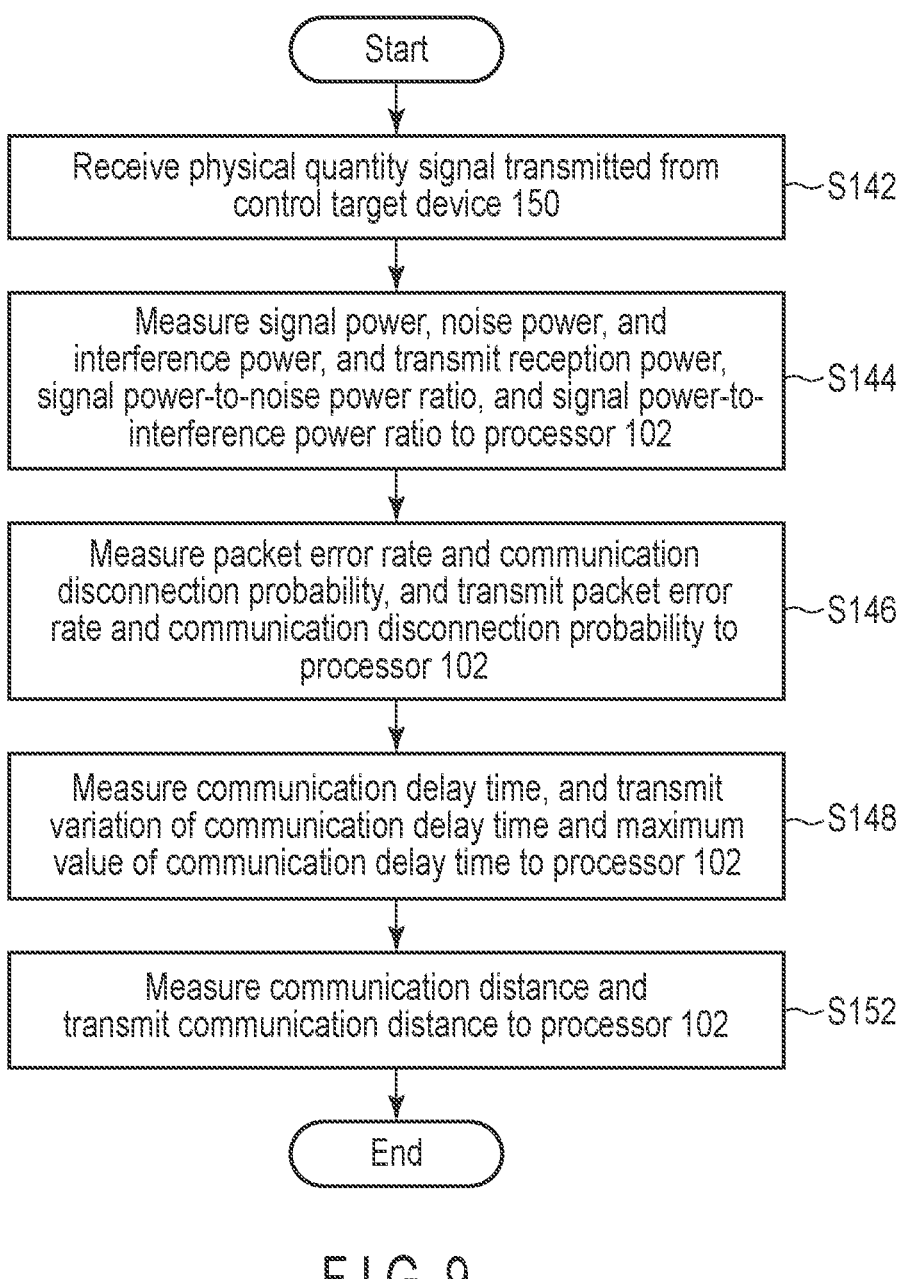

Start

Receive physical quantity signal transmitted from control target device 150 — S142

Measure signal power, noise power, and interference power, and transmit reception power, signal power-to-noise power ratio, and signal power-to-interference power ratio to processor 102 — S144

Measure packet error rate and communication disconnection probability, and transmit packet error rate and communication disconnection probability to processor 102 — S146

Measure communication delay time, and transmit variation of communication delay time and maximum value of communication delay time to processor 102 — S148

Measure communication distance and transmit communication distance to processor 102 — S152

End

F I G. 9

| Device name | Time | Control target device | | Communication quality | | | | | | | | Arithmetic value |
|---|---|---|---|---|---|---|---|---|---|---|---|---|
| | | Position (coordinates of antenna) | Direction (direction of main lobe of antenna) | Reception power | Signal power-to-noise power ratio | Signal power-to-interference power ratio | Communication distance | Packet error rate | Variation of communication delay time | Maximum value of communication delay time | Communication disconnection probability | |
| Device A | t1 | (xa1,ya1) | 90° | P1a-t1 | P2a-t1 | P3a-t1 | Da-t1 | PRa-t1 | DVa-t1 | DMa-t1 | DRa-t1 | ARa-t1 |
| | t2 | (ya2,xa2) | 180° | P1a-t2 | P2a-t2 | P3a-t2 | Da-t2 | PRa-t2 | DVa-t2 | DMa-t2 | DRa-t2 | ARa-t2 |
| | t3 | (xa3,xa3) | 180° | P1a-t3 | P2a-t3 | P3a-t3 | Da-t3 | PRa-t3 | DVa-t3 | DMa-t3 | DRa-t3 | ARa-t3 |
| | ... | ... | ... | ... | ... | ... | ... | ... | ... | ... | ... | ... |
| Device B | t1 | (xb1,yb1) | 90° | P1b-t1 | P2b-t1 | P3b-t1 | Db-t1 | PRb-t1 | DVb-t1 | DMb-t1 | DRb-t1 | ARb-t1 |
| | t2 | (yb2,xb2) | 90° | P1b-t2 | P2b-t2 | P3b-t2 | Db-t2 | PRb-t2 | DVb-t2 | DMb-t2 | DRb-t2 | ARb-t2 |
| | t3 | (xb3,xb3) | 180° | P1b-t3 | P2b-t3 | P3b-t3 | Db-t3 | PRb-t3 | DVb-t3 | DMb-t3 | DRb-t3 | ARb-t3 |
| | ... | ... | ... | ... | ... | ... | ... | ... | ... | ... | ... | ... |
| Device C | t1 | (xc1,yc1) | 90° | P1c-t1 | P2c-t1 | P3c-t1 | Dc-t1 | PRc-t1 | DVc-t1 | DMc-t1 | DRc-t1 | ARc-t1 |
| | t2 | (yc2,xc2) | 90° | P1c-t2 | P2c-t2 | P3c-t2 | Dc-t2 | PRc-t2 | DVc-t2 | DMc-t2 | DRc-t2 | ARc-t2 |
| | t3 | (xc3,xc3) | 90° | P1c-t3 | P2c-t3 | P3c-t3 | Dc-t3 | PRc-t3 | DVc-t3 | DMc-t3 | DRc-t3 | ARc-t3 |
| | ... | ... | ... | ... | ... | ... | ... | ... | ... | ... | ... | ... |

F I G. 10

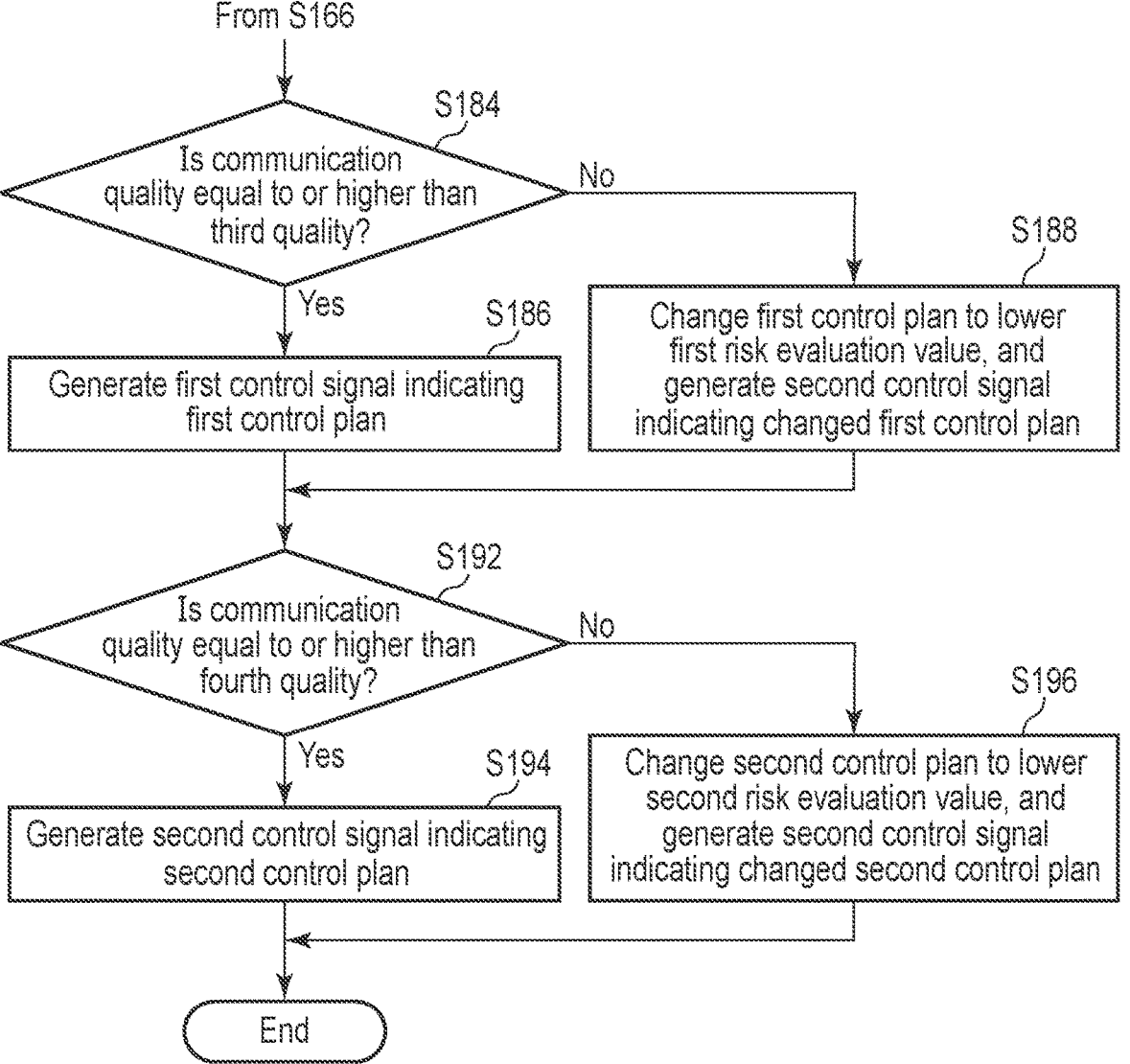
F I G. 15

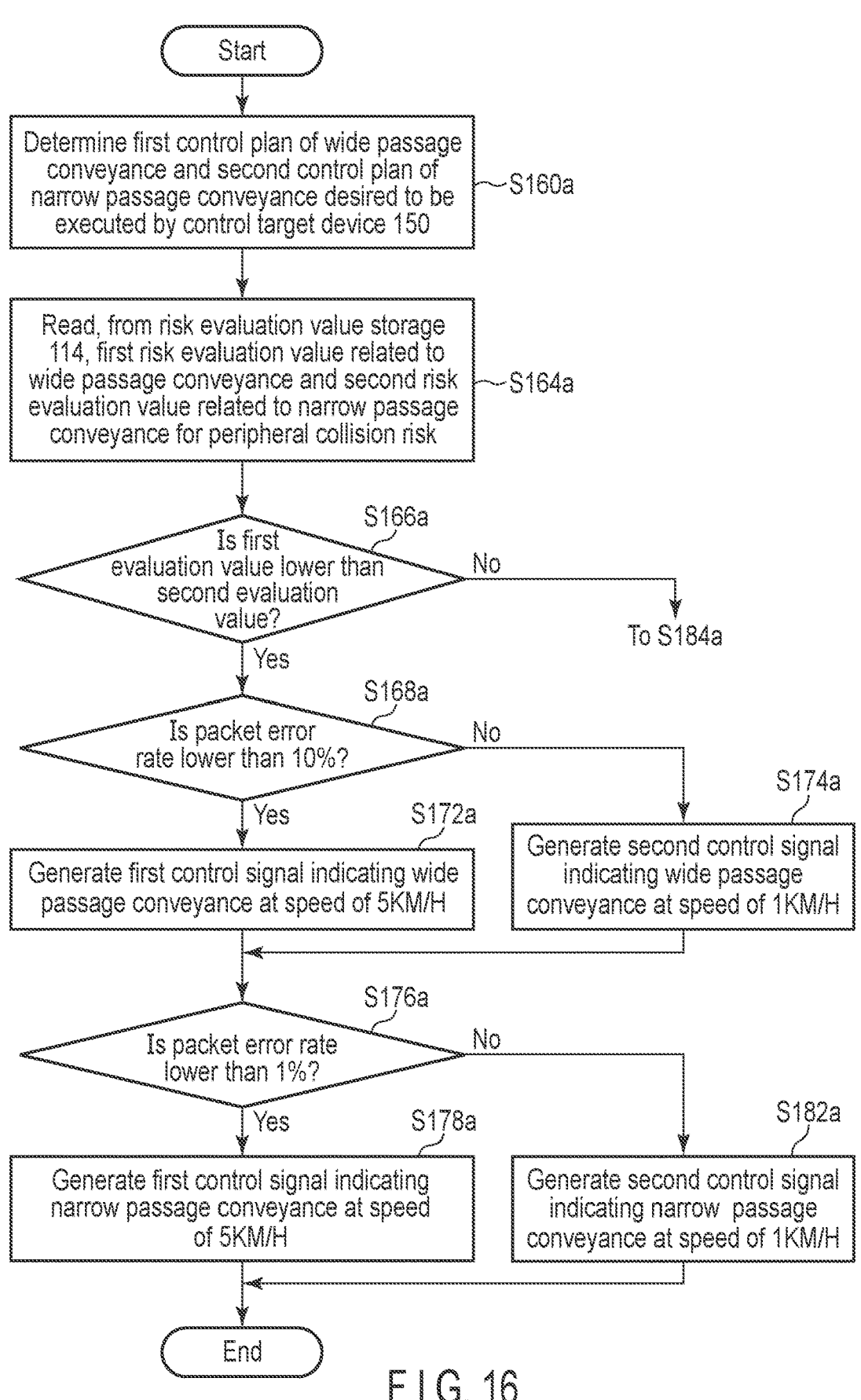
F I G. 16

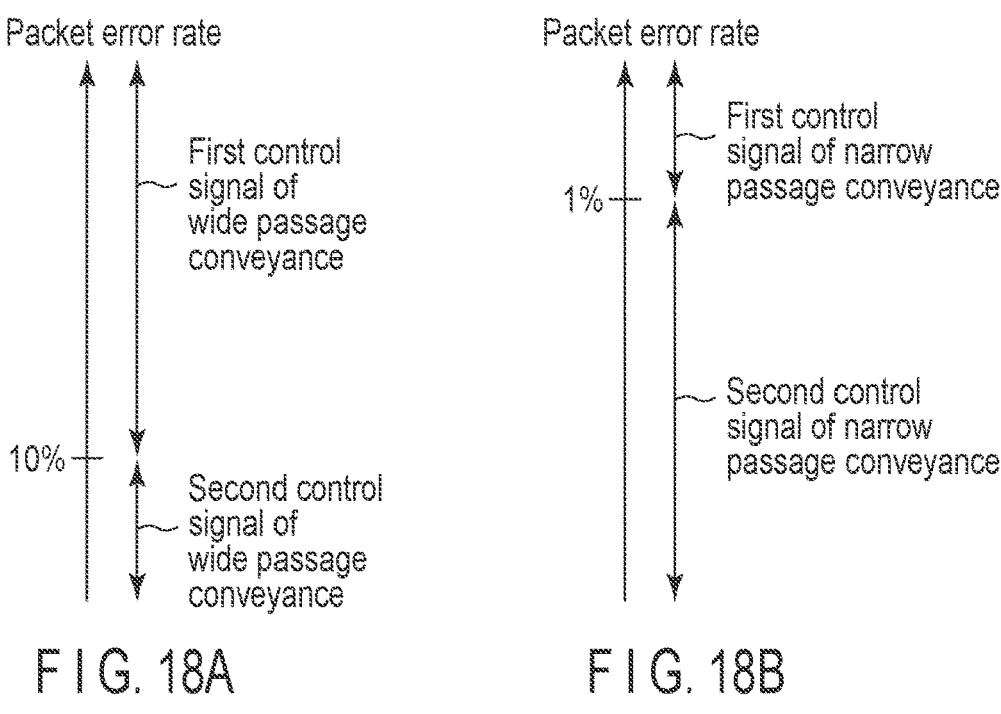
F I G. 18A           F I G. 18B
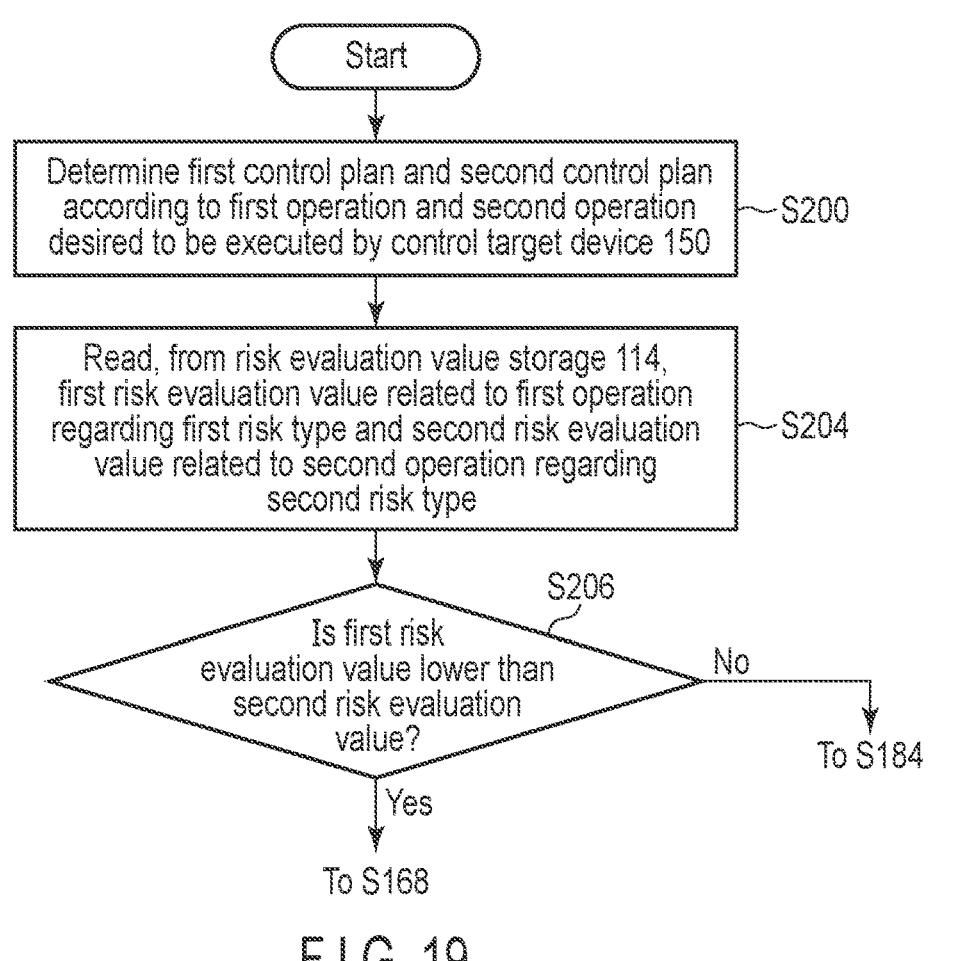
F I G. 19

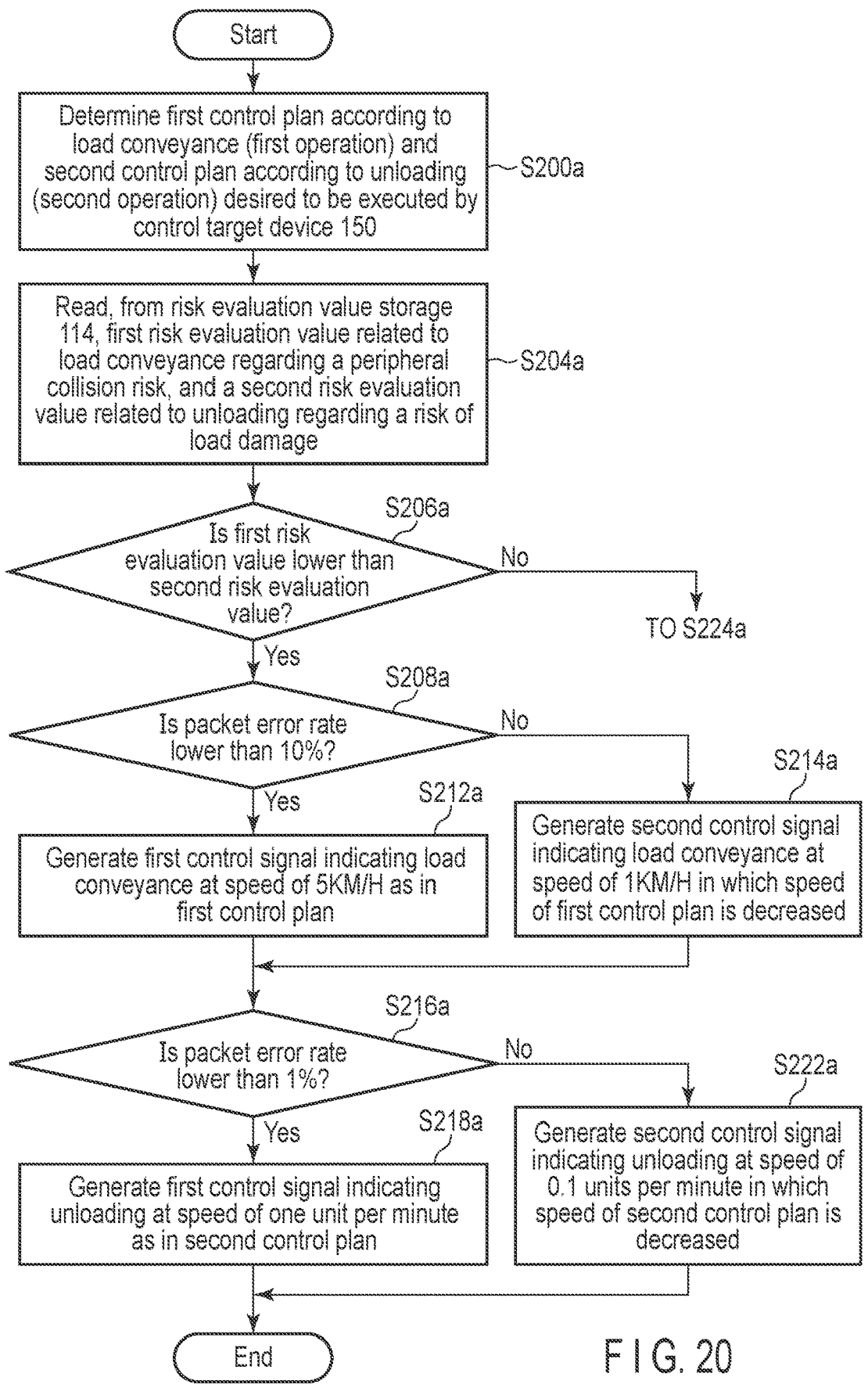
F I G. 20

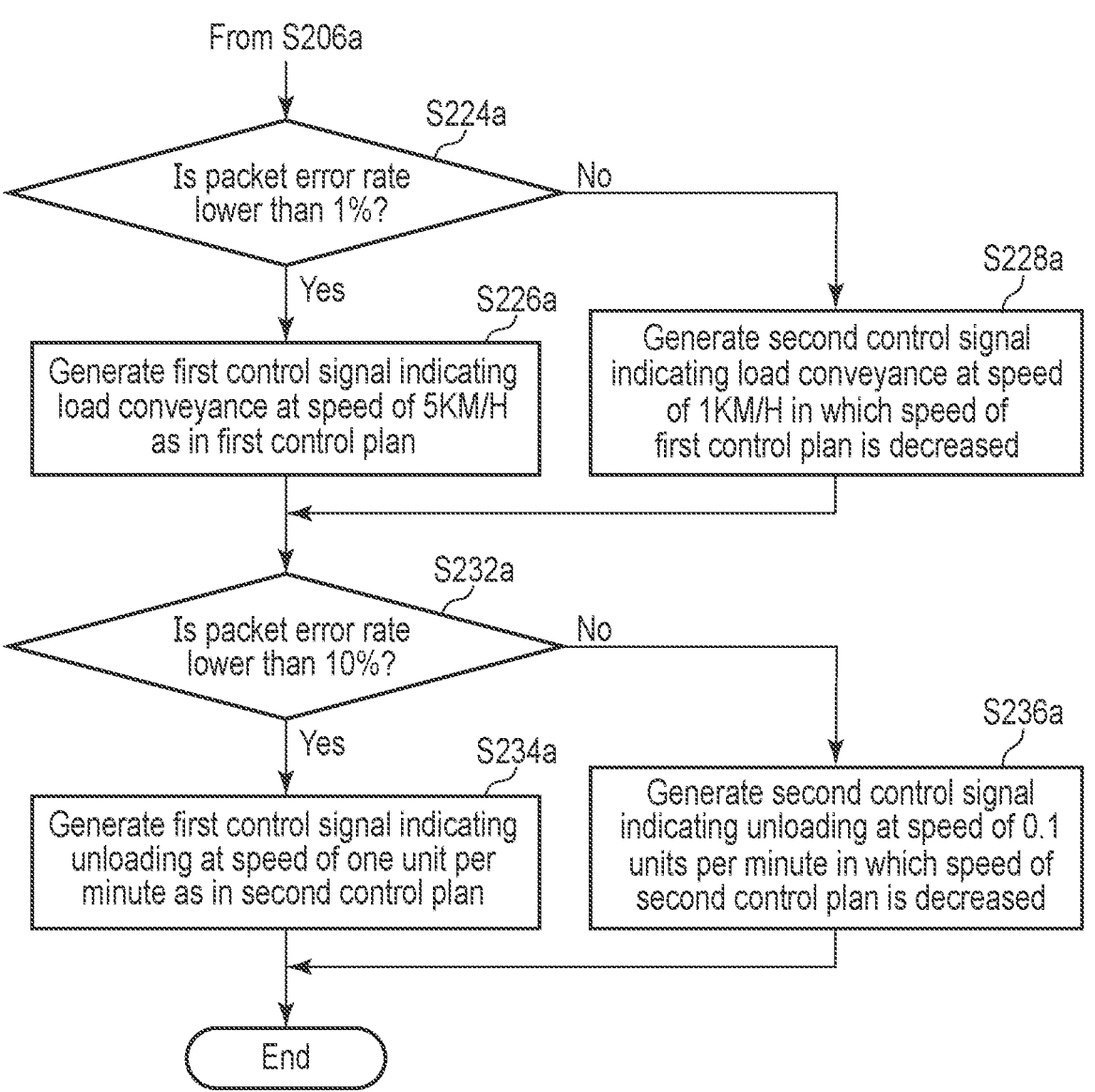
F I G. 21

| Operation type | Risk type | | | | | |
| --- | --- | --- | --- | --- | --- | --- |
| | Peripheral collision | Collision with another device | Load damage | Rollover | Incomplete operation | Isolation |
| Loading | N/A | N/A | Variation of communication delay time | N/A | Communication disconnection probability | Communication disconnection probability |
| Unloading | N/A | N/A | Variation of communication delay time | N/A | Communication disconnection probability | Communication disconnection probability |
| Conveying load through wide passage from point A to point B | Maximum value of communication delay time | Packet error rate | Variation of communication delay time | Variation of communication delay time | Communication disconnection probability | Communication disconnection probability |
| Conveying load through narrow passage from point A to point B | Maximum value of communication delay time | Packet error rate | Variation of communication delay time | Variation of communication delay time | Communication disconnection probability | Communication disconnection probability |
| Going around in factory and temporarily stopping at points A, B, and C | Maximum value of communication delay time | Packet error rate | Variation of communication delay time | Variation of communication delay time | Communication disconnection probability | Communication disconnection probability |
| ... | ... | ... | ... | ... | ... | ... |
| | Hereinafter, the same applies regardless of operation | Hereinafter, the same applies regardless of operation | Hereinafter, the same applies regardless of operation | Hereinafter, the same applies regardless of operation | Hereinafter, the same applies regardless of operation | Hereinafter, the same applies regardless of operation |

F I G. 22

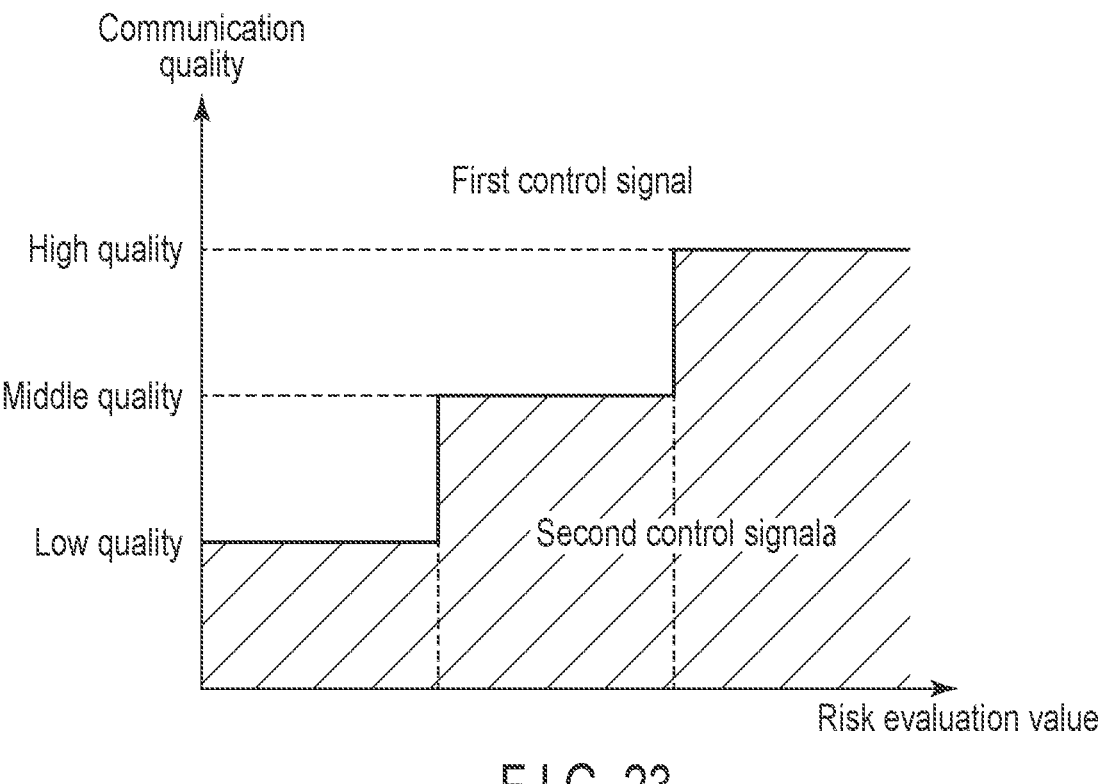
F I G. 23
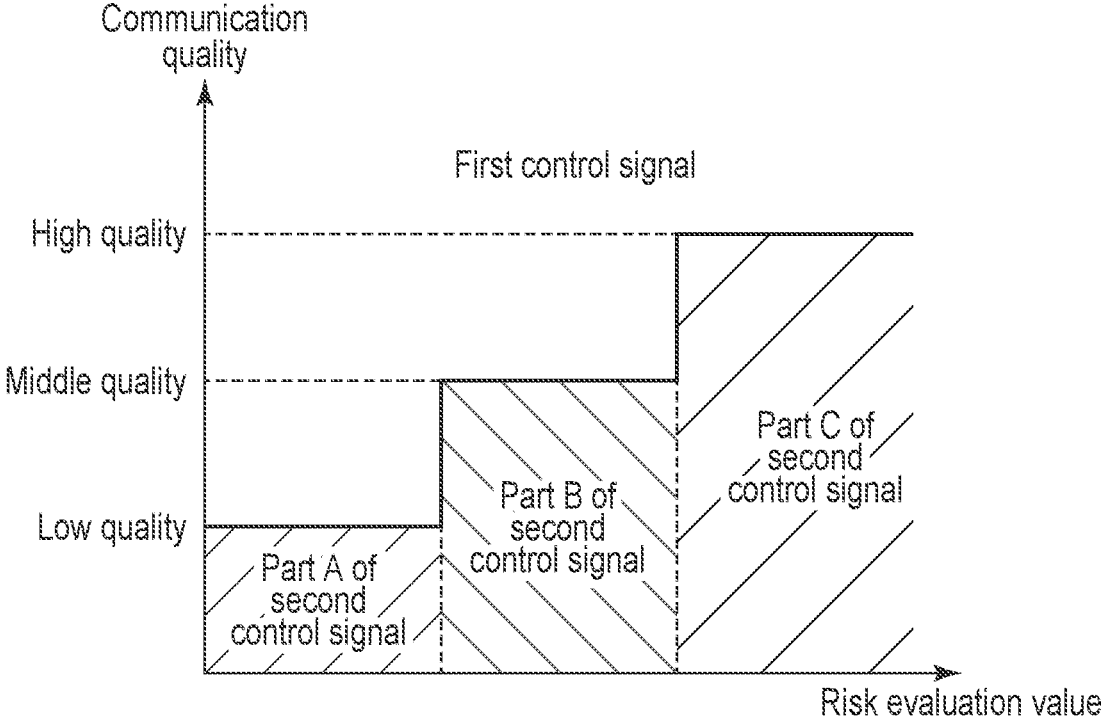
F I G. 24

ELECTRONIC APPARATUS, ELECTRONIC SYSTEM, METHOD, AND COMPUTER READABLE MEDIUM

CROSS-REFERENCE TO RELATED APPLICATIONS

This application is based upon and claims the benefit of priority from Japanese Patent Application No. 2020-132913, filed Oct. 30, 2020, the entire contents of which are incorporated herein by reference.

FIELD

Embodiments described herein relate generally to an electronic apparatus, an electronic system, a method, and a computer readable medium.

BACKGROUND

There is an electronic apparatus that instructs an operation of a control target device via wireless communication. Examples of the control target device include an automated (or automatic) guided vehicle (hereinafter, referred to as an AGV), an autonomous mobile robot (hereinafter, referred to as an AMR), a robot, a drone, and the like.

When a control signal is transmitted from the electronic apparatus to the control target device via wireless communication, the control signal may not be correctly transmitted. If the operation of the control target device is not normally performed, there is a possibility of increasing the risk of causing damage to the control target device itself, a load carried by the control target device, a periphery of the control target device, or other control target devices.

BRIEF DESCRIPTION OF THE DRAWINGS

FIG. 1 illustrates an example of a control system according to a first embodiment.

FIG. 2 illustrates an example of a control device according to the first embodiment.

FIGS. 5A and 5B illustrate examples of the risk information stored in the risk evaluation value storage according to the first embodiment.

FIG. 7 is a flowchart of an operation in which the control target device measures the communication quality according to the first embodiment.

FIG. 8 illustrates an example of the communication quality information acquired by the communication quality acquirer according to the first embodiment.

FIG. 9 is a flowchart of an operation in which the control device measures the communication quality according to the first embodiment.

FIG. 10 illustrates an example of the communication quality information stored in the communication quality storage according to the first embodiment.

FIG. 15 shows a flowchart of a second operation example in the control signal generator according to the first embodiment.

FIG. 16 shows a flowchart of a specific example of the second operation in the control signal generator according to the first embodiment.

FIGS. 18A and 18B illustrate the control signals in the second control operation according to the first embodiment.

FIG. 19 is a flowchart of a third operation example in the control signal generator according to the first embodiment.

FIG. 20 shows a flowchart of a third specific operation example in the control signal generator according to the first embodiment.

FIG. 21 shows a flowchart of a third specific operation example in the control signal generator according to the first embodiment.

FIG. 22 illustrates an example of information stored in the risk, evaluation, value storage according to a fourth specific operation example according to the first embodiment.

FIG. 23 illustrates a relationship among two types of the control signals, the risk evaluation value, and the communication quality according to a modification of the first embodiment.

FIG. 24 illustrates a relationship among two types of the control signals, the risk evaluation value, and the communication quality according to another modification of the first embodiment.

DETAILED DESCRIPTION

Figure 3:
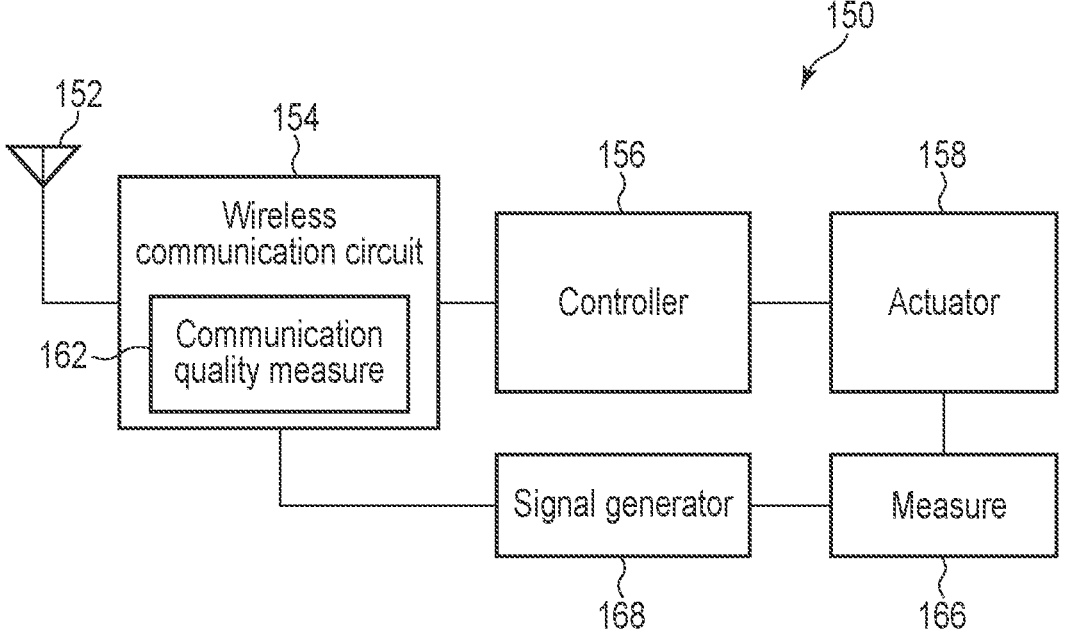
FIG. 3 illustrates an example of a control target device according to the first embodiment.

Various embodiments will be described hereinafter with reference to the accompanying drawings.

The disclosure is merely an example and is not limited by contents described in the embodiments described below. Modification which is easily conceivable by a person of ordinary skill in the art comes within the scope of the disclosure as a matter of course. In order to make the description clearer, the sizes, shapes, and the like of the respective parts may be changed and illustrated schematically in the drawings as compared with those in an accurate representation. Constituent elements corresponding to each other in a plurality of drawings are denoted by like reference numerals and their detailed descriptions may be omitted unless necessary.

In general, according to one embodiment, an electronic apparatus instructs an operation of at least a part of a control target device via wireless communication. The electronic apparatus comprises a processor configured to acquire communication quality information of the wireless communication between the electronic apparatus and the control target device, acquire first information indicating a degree of a risk that can be caused by the operation, and generate a control signal instructing the operation based on the communication quality information and the first information.

First Embodiment

FIG. 1 illustrates an example of a concept of a control system 300 according to a first embodiment. The control system 300 includes a control device 100 and a control target device ISO. The control target device 150 is, for example, an AGV, an AMR, a robot, a drone, a robot arm, or the like, or a motor included in these devices. The AMR and the AGV are also referred to as automated guided vehicles. The control system 300 may be also an electronic system, and the control apparatus 100 may be also an electronic apparatus. Although FIG. 1 illustrates one control target device 150, the control system 300 may include a plurality of control target devices 150. That is, the control system 300 includes at least one control target device 150.

The control device 100 controls at least a part of operations of the control target device 150 via wireless communication. In a case where the control target device 150 includes a plurality of portions, at least a part of the control target device 150 is at least one portion. In a case where the control target device 150 is an AGV, an AMR, a robot, a drone, or the like, the control device 100 controls at least operations of a motor or a steering part thereof. The control device 100 transmits a control signal far instructing an operation to the control target device 150. The control target device 150 is driven to change at least a part of its position in accordance with the received control signal. For example, the control target device 150 changes an overall position of the control target device 150. Alternatively, a position of a part of portions of the control target device 150 may be changed.

A part of portions are, for example, some joints in a robot or a robot arm. The position may be a position in a two-dimensional space or a position in a three-dimensional space. The position change also includes a change in which its position is not apparently changed. For example, the control target device 150 may control a portion capable of changing its rotation or posture at a same position or a portion capable of generating pressure, light, sound, or the like.

An instruction of the operation from the control device 100 to the control target device 150 is performed by instructing a target value of a physical quantity, whether or not to perform a predetermined action, or the like regarding at least a part of the operations of the control target device 150 at regular intervals of time. The operation of the control target device 150 indicates at least one of a change in the position of at least a part of the control target device 150, or execution of a predetermined action. The target value may be a target value at an instruction time or a target value at a certain future time. Similarly, the predetermined action may be an action performed at the instruction time or an action scheduled to be performed at a certain time in the future. Hereinafter, in order to realize a certain operation, information instructing at least one of the target value of the physical quantity for each time in a predetermined period and a presence or absence of the predetermined action is also referred to as a control plan. The physical quantity represents, for example, a position, a speed, an acceleration, and the like related to the operation of the control target device 150. A control signal indicating the control plan is transmitted to the control target device 150.

The target, value includes at least one of a position, a speed, and an acceleration. Note that the position, speed, and acceleration include not only values in a three-dimensional space but also a position, speed, and acceleration in rotation. For example, the position includes an angle, a rotation angle, and a rotation speed. The speed includes a rotation speed and an angular velocity. The acceleration includes a rotation acceleration. The angle and the rotation angle may represent a direction of the control target device 150. The control target device 150 receives the control signal and executes an operation to realize the control plan indicated by the control signal.

Some examples of the control plan are described. In order to change the overall position of the control target device 150, the control plans include a target value of the position (coordinates) of the control target device 150 for each time. For example, when an x-coordinate, a y-coordinate, and a z-coordinate at time t are expressed as (t, x, y, z), the control plans at times t1 to t5 are expressed as (t1, x1, y1, z1), (t2, x2, y2, z2), (t3, x3, y3, z3), (t4, x4, y4, z4), and (t5, x5, y5, z5).

In a case where the control target device 150 is a robot, a robot arm, or the like, it is also conceivable to change a position of a portion (for example, a joint) of the control target device 150. In this case, the control plans include a target value of the position (angle) of the control target device 150 for each time. The control plan may include a target value related to a change in each position in the plurality of portions of the control target device 150. For example, when an angle θ of a first joint, an angle φ of a second joint, and an angle ω of a third joint at time t are expressed as (t, θ, φ, ω), the control plans at times t1 to t5 are expressed as (t1, θ1, φ1, ω1), (t2, θ2, φ1, ω1), (t3, θ2, φ2, ω1), (t4, θ2, φ2, ω3), and (t5, θ3, φ3, ω3).

The control target device 150 may perform a predetermined action at a predetermined time. As the predetermined action, for example, the control target device 150 may perform a notification (warning) by light, sound, displaying on a monitor, a gripping action (gripping operation), or the like at a predetermined time. In this case, whether or not to perform the predetermined action may be included in the control plan nor each time. Tor example, the presence or absence of the predetermined action at time t is expressed as (t, present) or (t, absent). As an example, in a case where the position (angle) of the control target device 150 for each time described above is set, the control plans are expressed as (t1, θ1, φ1, ω1, absent), (t2, θ2, φ2, ω1, absent), (t3, θ2, φ2, ω1, present), (t4, θ2, φ2, ω3, absent), and (t5, θ3, φ3, ω3, absent).

In a case where the control system 300 includes a plurality of control target devices 150, the control device 100 transmits the plurality of control signals to the control target devices 150 using a plurality of wireless resources. The plurality of wireless resources are different in at least one of time, frequency, space, and code. That is, the control device 100 transmits the control signals by using at least one of time division, frequency division, spatial division, and code division. The spatial division means that different antennas are used for transmission of the control signals, or that different beams are used for transmission of the control signals even with the same antenna. For example, it is assumed that transmission is performed using MIMO.

Any wireless communication standard can be applied to the wireless communication between the control device 100 and the control target devices 150. Examples of applicable wireless communication standards include wireless LAN, 3G, 4G, LTE, 5G, Bluetooth (registered trademark), and ZigBee (registered trademark). In the present embodiment, as an example, a case where a 5G wireless communication standard is applied to wireless communication between the control device 100 and the control, target device 150 will be described.

FIG. 2 illustrates an example of a configuration, diagram of the control device 100. FIG. 3 illustrates an example of a configuration diagram of the control target device 150. The control device 100 includes a processor 102, a wireless communication circuit 104, and at least one antenna 106. The processor 102 includes a communication quality acquirer 112, a risk evaluation value storage 114, a control signal generator 116, a wireless communication controller 118, a communication quality storage 120, and a communication quality estimator 122. The wireless communication circuit 104 includes a communication quality measure 124. A connection between the modules in FIG. 2 may be a wired connection or a wireless connection.

The control target device 150 includes an antenna 152, a wireless communication circuit 154, a controller 156, an actuator 158, a measure 166, and a signal generator 163. The wireless communication circuit 154 includes a communication quality measure 162. The control target device 150 is a device that receives a control signal from the control device 100 and operates. The control target device 150 is, for example, a robot that moves by wheels, a robot that walks by a plurality of legs, or the like, and includes a robot arm, an endoscope with a movable distal end and the like. The control target device 150 also includes a vehicle, a bogie, an object capable of flying (a manned airplane, an unmanned aerial vehicle (UAV) such as a drone, and the like.

In the control device 100, the control signal generator 116 determines a control plan according to an operation of at least a part of the control target device 150, and generates a control signal indicating the control plan. Furthermore, the control signal generator 116 changes the control plan with reference to the communication quality information transmitted from the communication quality acquirer 112 and risk evaluation value information read from the risk evaluation value storage 114. The control signal generator 116 generates a control signal indicating the control plan after the change. The control, signal generator 116 transmits the generated control signal to the wireless communication controller 118. The wireless communication controller 118 converts the control signal transmitted from the control signal generator 116 as a packet signal suitable for wireless transmission, and transmits the packet signal to the wireless communication circuit 104. The wireless communication circuit 140 modulates the packet signal, up-converts the modulated packet signal into a wireless frequency packet signal, and transmits the wireless frequency control signal packet to the control target device 150 via the antenna 106.

When the control system 300 includes a plurality of (for example, two) control target devices 150, the wireless communication circuit 104 transmits a packet signal indicating a control signal for a first control target device 150 to the first control target device 150 using a first wireless resource, and transmits a packet signal indicating a control signal for a second control target device 150 to the second control target device 150 using a second wireless resource via the antenna 106. The first wireless resource and the second wireless resource are network slices logically configured in one wireless communication standard. For example, when a cellular network such as LTE, 4G, or 5G is used for transmission of a control signal and a partial control signal, the first wireless resource, and the second wireless resource are network slices separated in terms of at least one or both of a MAC layer and a PHY layer. By using such network slices, at least one of time, frequency, and space can be set to different wireless resources.

In the control target device 150, the wireless communication circuit 154 receives the control signal packet via the antenna 152, down-converts and demodulates the wireless frequency control signal packet, and transmits the demodulated control signal to the controller 156. The controller 156 drives the actuator 158 to realize an operation of the control target device 150 for each time indicated by the control signal.

The actuator 158 is a drive device mounted on the control target device 150. The actuator 158 is, for example, a motor, a wheel (including a steering mechanism), an engine, a propeller, or the like. In the present embodiment, as an example, a motor or a wheel will be described. The actuator 158 is driven by an instruction from the controller 156 to drive at least a part of the control target device 150. For example, when a rotational, speed of a motor of the actuator 158, a direction of a wheel, and the like are instructed by the controller 156, the actuator 158 is driven with the instructed rotational value and direction. By driving the actuator 156, a change in the position of at least a part of the control target device 150 is realized.

The control target device 150 is a device that executes an operation indicated by the control signal and changes at least a part of the position. The measure 166 measures a physical quantity of the control target device 150 associated with at least a part of the operation at predetermined time intervals. The signal generator 169 generates a physical quantity signal including the physical quantity measured by the measure 166 as physical quantity information, and transmits the physical quantity signal to the wireless communication circuit 154 at predetermined time intervals. The wireless communication circuit 154 transmits the physical quantity signal to the control device 100 in parallel with the operation of the control target device 150. The physical quantity signal includes at least one of the physical quantity such as a position, a speed, and an acceleration of at least a part of the control target device 150 and a direction (traveling direction) of the control target device 150, and an execution result of a predetermined action. Any device capable of measuring a physical quantity of the control target device 150 can be applied as the measure 166, and examples thereof include an encoder that measures a position in rotation, a global navigation satellite system (GNSS) receiver that acquires two-dimensional, or three-dimensional positions of the control target device 150, and a speedometer that measures a speed.

Figure 4:
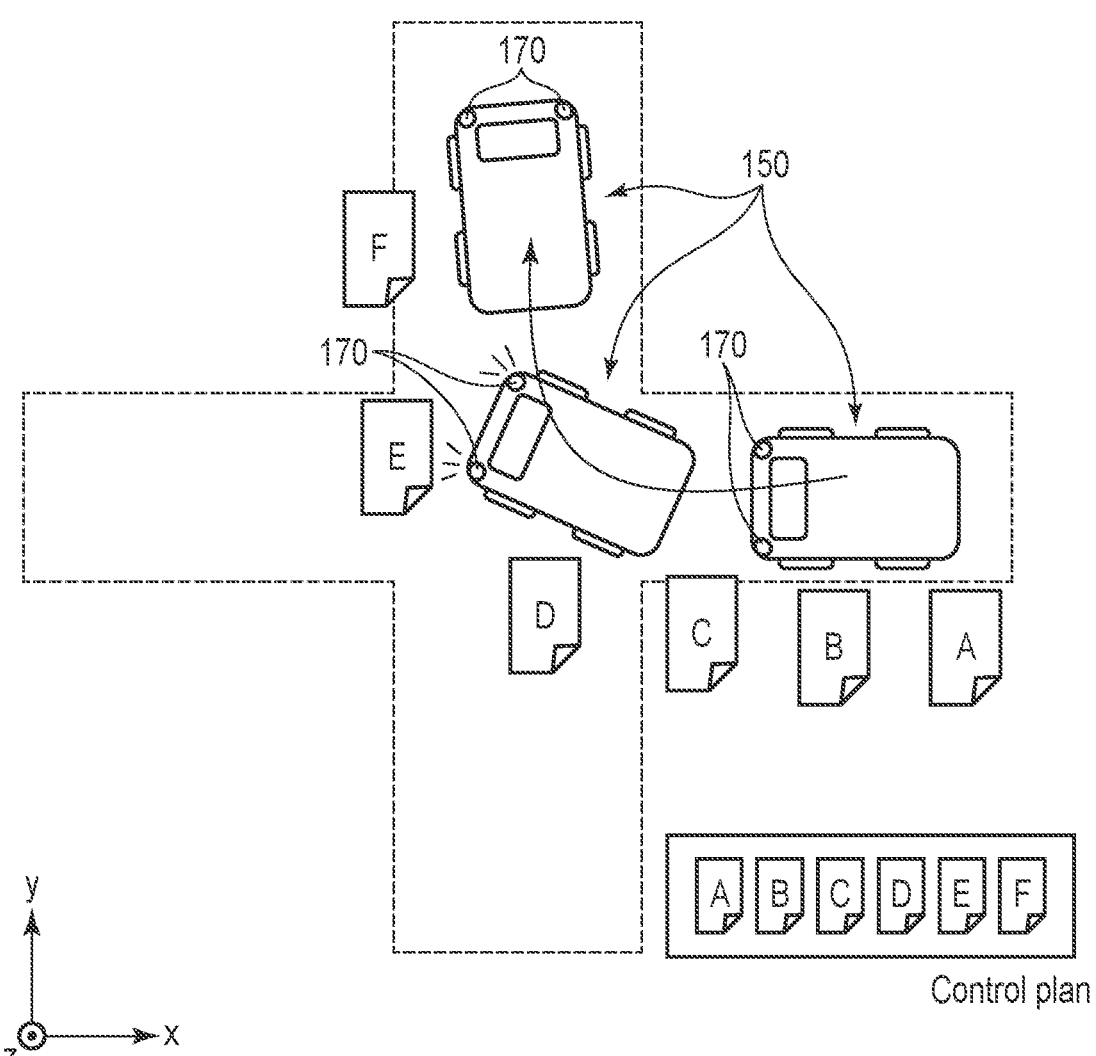
FIG. 4 is a diagram illustrating a control plan of the control target device according to the first embodiment.

FIG. 4 is a diagram illustrating a control plan of the control target device 150 as an example of the present embodiment. The control signal generator 116 determines a control plan for instructing at least one of a target value of a physical quantity and a presence or absence of a predetermined action for each certain period of time (for example, one second) regarding a certain operation, and generates a control signal indicating the control plan. Here, a case where the control target device 150 generates a control signal related to an operation of turning right at a crossroad indicated by a broken line will be described. It is assumed that there is some object (such as a wall) other than the crossroad.

The control signal generator 116 determines a control plan including time, a target position (coordinates) of the control target device 150 at the time, and a presence or absence of notification (for example, blinking of a lamp 170 provided in the control target device 150) accompanying a direction change. The control plans for respective times tA, tB, tC, tD, tE, and tF at regular time intervals are defined as control plans A, B, C, D, E, and F. The control plan A is expressed as (tA, xA, yA, no notification). The control plan B is expressed as (tE, xB, yB, notified). The control plan C is expressed as (tC, xC, yC, notified). The control plan D is expressed as (tD, xD, yD, notified). The control plan E is expressed as (tE, xE, yE, notified). The control plan F is expressed as (tF, xF, yF, no notification).

The control signal generator 116 generates a control signal indicating the control plan A at time tC before time tA. In the control plan A, it is instructed to move the control target device 105 to be located at the point (xA, yA) at the time tA and not to blink the lamp 170 at the point. The control signal includes an instruction to move the control target device 150 in a direction corresponding to a difference between the position (x0, y0) of the control target device 150 at the time t0 and the target position (xA, yA) at a speed corresponding to the difference. The interval between the times t0 and tA is a constant time between the times tA, tB, tC, tD, tE, and tF. Hereinafter, similarly, the control signal generator 116 generates control signals indicating the control plane B, C, D, E, and F at times tA, tB, tC, tD, and tE.

Note that the control signal generator 116 may finely adjust the control, plans based on the physical quantity signal from the control target device 150. For example, in a case where the control target device 150 has not reached the target position by the time included in the control signal, the target position of each control plan may be adjusted, or the number of times at which the control plan is generated may be increased. That is, a fine operation is performed.

The control plans A, B, and F include an operation for causing the control target device 150 to travel straight, and the control plans C, D, and E include an operation for causing the control target device 150 to turn right. In the operation to turn right, the control target device 150 may not be able to respond to the control signal and turn right, and may collide with the wall. When the collision with the wall occurs, the control target device 150 or the wall may be broken. On the other hand, in the straight traveling operation, even if the control target device 150 cannot respond to the control signal, the possibility of colliding with the wall is low. As described above, an influence in a case where the operation is not performed normally varies depending on a type of operation.

Therefore, in the embodiment, when the control signal generator 116 generates the control signal, the control plan is determined in consideration of the influence in a case where at least a part of the operation of the control target device 150 is not made. In the following description, this influence is referred to as a risk. Examples of the risk include collision with its surroundings, collision with another device, damage to a moving load, failure to end a predetermined operation at a target time, stopping and becoming uncontrollable, and the like.

A degree of a risk represents a degree of influence on the control target device 150 or an influence on a periphery of the control target device 150 in a case where the control target device 150 has not reached the target position at each time indicated in the control plan and/or in a case where the predetermined action has not been achieved. For example, the degree of a risk indicates a degree of possibility that the control target device 150 itself is damaged, a degree of possibility that the control target device 150 comes into contact with a surrounding object, another device, or the like, or a degree of possibility that the surrounding object is damaged by the contact. The degrees of these possibilities are determined according to a moving speed of the control target device 150, a characteristic (narrowness or wideness)

of a space in which the control target device 150 exists, a positional relationship between the control target device 150 and another device or the surrounding object, and the like.

The degree of a risk (or influence) can be represented by an amount of damage given to the periphery of the control target, device 150, another control target device 150, the control target device 150 itself, or a load or the like conveyed by the control target device 150. It is assumed that the degree of a risk is larger or higher as the amount of the damage is higher.

For example, a risk caused by an operation of transporting an expensive product by the AGV is high, but a risk caused by an operation of transporting an inexpensive product is low. In addition, in an operation in which the AGV moves at a high speed while changing its moving direction, a possibility that a person is injured by the contact of the AGV with the person is high, and a possibility that a product or the AGV itself is damaged by the overturning of the AGV is high, and the risk caused by the operation is high. Conversely, in an operation in which the AGV goes straight at a low speed, a possibility that the AGV comes into contact with a person is low, and a possibility that the AGV rolls over is low, and a risk caused by the operation is low. Information indicating a damaged amount of risk caused by an operation is referred to as risk information.

In the example of the control plan illustrated in FIG. 4, a risk caused by a right-turn operation is high, and a risk caused by a straight-forward operation is low.

The damaged amount is an amount of money in a case where one operation is not performed normally. The total damaged amount in a case where a plurality of operations is not normally performed in a certain period also depends on a risk occurrence frequency, that is, an occurrence probability. Even if a damaged amount of risk caused by one operation is high, a total damaged amount of the risk having a low occurrence probability in a certain period may be lower than a total damaged amount of another risk having a high occurrence probability in a certain period while a damaged amount of another risk caused by one operation is low. Therefore, the information regarding risk may be defined in consideration of an occurrence probability. The risk information multiplied by the occurrence probability is referred to as a risk evaluation value.

The risk evaluation value storage 114 stores the risk information and the occurrence probability for each type of the risk. The occurrence probability is also determined according to the risk. The risk evaluation value storage 114 may store the risk evaluation value for each type of the risk instead of storing the risk information and the occurrence probability for each type of the risk. Furthermore, the risk evaluation value storage 114 may store only risk information for each type of the risk. That is, the risk information may be used as a risk evaluation value. For example, a risk having a very large value of the risk information (for example, the damaged amount is several hundred million yen) has a very large influence even if the occurrence probability is low if the risk occurs even once.

The control signal generator 116 refers to the risk evaluation value to determine whether or not to change the control plan.

FIGS. 5A and 5B illustrate examples of the risk information stored in the risk evaluation value storage 114. FIGS. 5A and 5B illustrate risk evaluation values related to the operation of the AGV and the robot arm (or the robot) that perform a load transportation work in a distribution warehouse.

Examples of the type of operation include a "loading" operation in which a robot or a robot arm loads a load on the AGV at a loading place, an "unloading" operation in which the robot or the robot arm unloads the load from the AGV at an unloading place, an operation in which the AGV conveys the load through a wide passage from the point A to the point B, an operation in which the AGV conveys the load through a narrow passage from the point A to the point B, an operation in which the AGV goes around in a warehouse and temporarily stops at the points A, B, and C, an operation in which the AGV goes straight by 2 m, a right turn operation in which the AGV turns right, an operation in which the AGV goes straight by 3 m and stops, an operation in which the AGV passes behind products, an operation in which the robot arm grips the load, an operation in which the AGV conveys the load in cooperation with the other AGV, an operation in which the AGV moves to a charging station, and an operation in which the AGV or at least a part of the robot rotates.

The "loading" and the "unloading" may not be performed by the robot or the robot arm, and may be performed by a worker. In this case, the AGV includes a table or a container on which the load is placed, and the table or the container may move up and down in accordance with "loading" or "unloading".

Here, it is assumed that at least one of the robot and the robot am is fixed to each of the loading place and the unloading place. However, the robot or the robot arm may be movable such as the AGV, and may move to the loading place and the unloading place together with the AGV.

The types of risk include a risk that the control target device 150 collides with the surroundings, a risk that the control target device 150 collides with another, control target device 150, a risk that a carried load is damaged, a risk that the control target device 150 rolls over, a risk that an instructed operation cannot be completed, a risk that the control target device 150 becomes uncontrollable and isolated, and the like.

The risk evaluation value storage 114 stores risk information and an occurrence probability for each operation type and risk type. N/A indicates that no risk occurs or the occurrence probability is lower than a predetermined probability. Since one of the robot or the robot aria is fixed to each of the loading place and the unloading place and it is assumed that they do not move, the collision risk and the rollover risk do not occur in the loading operation and the unloading operation.

The risk evaluation value storage 114 includes, for example, a memory such as a random access memory (RAM), a programmable ROM (PROM), an erasable PROM (EPROM), an electrically EPROM (EEPROM), a flash memory, or a register. Note that the risk evaluation value storage 114 may be provided not only inside the processor 102 but also outside the processor 102 or the control device 100. In a case where the risk evaluation value storage 114 is provided outside the processor 102 or the control device 100, the risk evaluation value storage 114 may be a cloud that holds information via the Internet.

Figure 6:
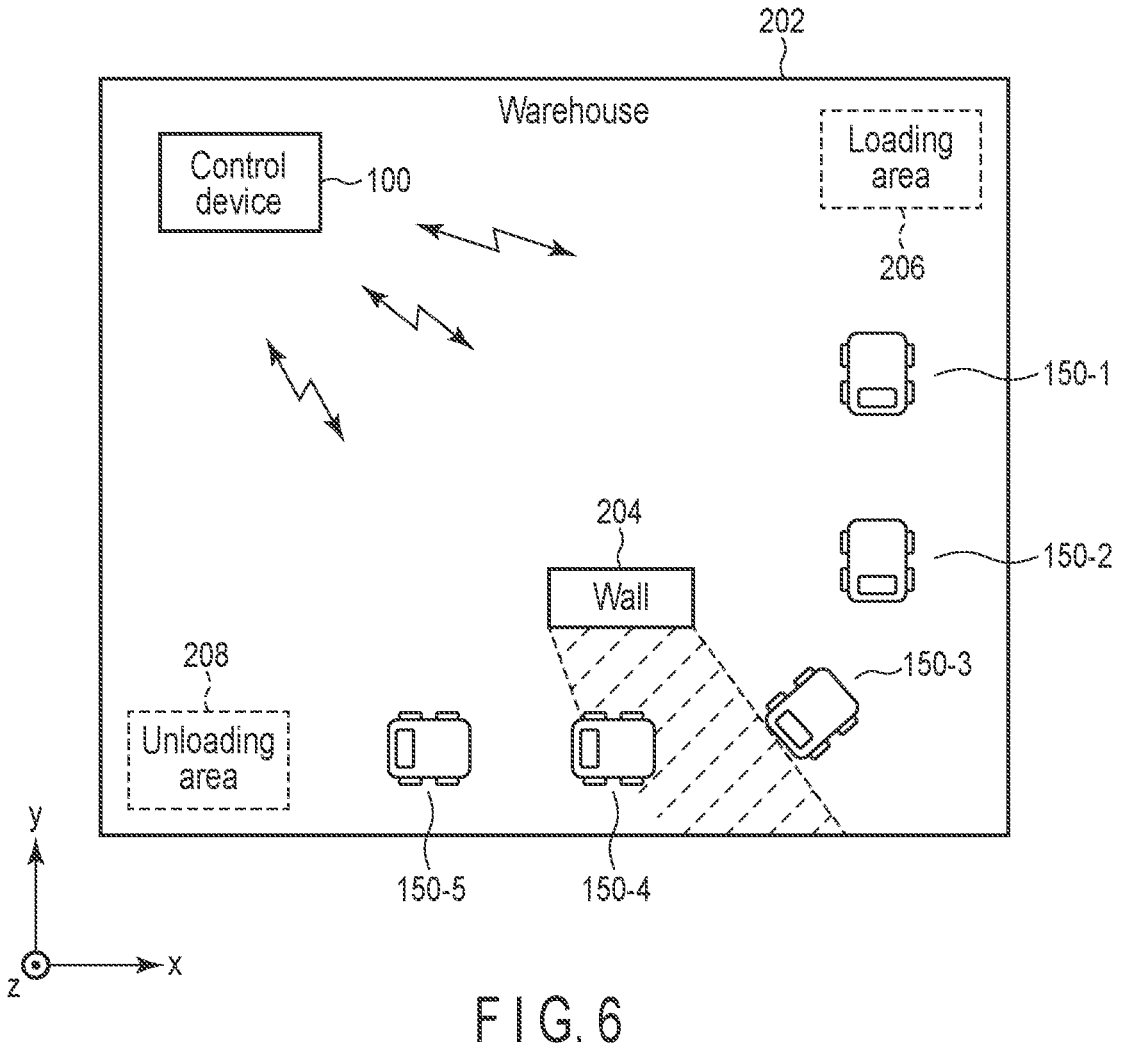
FIG. 6 illustrates an example of a load transport system in a distribution warehouse as an example of the control system according to the first embodiment.

Next, a relationship between the communication quality and risk will be described. FIG. 6 illustrates an example of a load transport system in a distribution warehouse as an example of the control system 300. The control device 100 and the AGV 150 as a control target device are arranged in a warehouse 202. The control device 100 moves the AGV 150 from a loading area 206 to an unloading area 208. The AGV 150 moves from a position 150-1 to a position 150-5 with a lapse of time. When there is a wall 204 in the warehouse 202, a radio wave from the control device 100 hardly reaches a rear side (shaded area) of the wall 204 as viewed from the control device 100, and the communication quality is low (or poor) in the area. Therefore, the AGV 150 is difficult to receive a control signal during a movement from the position 150-3 to the position 150-4, and there is a possibility that an operation instructed by the control device 100 cannot be executed.

As described above, the communication quality of the wireless communication between the control device 100 and the control target device 150 also affects at least, a part of operation of the control, target device 150.

The control signal generator 116 determines whether or not to change the control plan with reference to the communication quality in addition to the risk evaluation value.

The communication quality may be measured by the control device 100 or may be measured by the control target device 150.

Examples of the communication quality include reception power, a signal power-to-noise power ratio, a signal power-to-interference power ratio, a communication distance, a packet error rate, a variation of communication delay time, a maximum value of communication delay time, and a communication disconnection probability. The communication quality may be a value calculated using these values.

First, an example in which the control target device 150 measures the communication quality will be described. The control signal packet is transmitted from the control device 100 to the control target device 150, and it can be said that the communication quality at the time of receiving the control signal packet represents the communication quality that affects the operation.

The communication quality measure 162 of the control target device 150 can calculate the communication quality such as, for example, a reception power, a signal power-to-noise power ratio, a signal power-to-interference power ratio, a packet error rate, a variation of communication delay time, a maximum value of the communication delay time, and a communication distance from a reception characteristic received at a time of wireless reception. The communication quality may include a value calculated using these measured values.

The wireless communication circuit 154 transmits the communication quality information indicating the communication quality measured by the communication quality measure 162 to the control device 100 via the antenna 152.

FIG. 7 is a flowchart of an operation in which the control target device 150 measures the communication quality. The communication quality measuring operation of the control target device 150 will be described with reference to FIG. 7.

The wireless communication circuit 154 receives the control signal transmitted from the control device 100 (step S122).

The communication quality measure 162 measures a signal power, a noise power, and an interference power, obtains a reception power, a signal power-to-noise power ratio, and a signal power-to-interference power ratio, and transmits the reception power, the signal power-to-noise power ratio, and the signal, power-to-interference power ratio to the control device 100 as the communication quality information (step S124).

The communication quality measure 162 measures a packet error rate and a communication disconnection probability, and transmits the measurement result to the control device 100 as the communication quality information (step S126).

The communication quality measure 162 measures a communication delay time, obtains a variation of communication delay time and a maximum value of the communication delay time, and transmits the variation of communication delay time and the maximum value of the communication delay time to the control device 100 as the communication quality information (step S123).

The communication quality measure 162 measures a communication distance and transmits the communication distance as the communication quality information to the control device 100 (step S132).

Since the communication quality changes based on a movement of the control target device 150 or the like, the communication quality measure 162 measures the communication quality at regular time intervals, for example, one second intervals, and transmits the measured the communication quality information to the control device 100. At least a part of the communication quality measured in steps S124, S126, S128, and S132 and the transmitted the communication quality information may be omitted. In addition, the order of steps S124, S126, S128, and S132 may be partially changed.

In the control device 100, the wireless communication circuit 104 receives the communication quality information via the antenna 106, and transmits the communication quality information to the communication quality acquirer 112 and the communication quality storage 120.

The communication quality acquirer 112 acquires the communication quality information transmitted from the wireless communication circuit 104, and transmits the acquired the communication quality information to the control signal generator 116. When acquiring the communication quality information, the communication quality acquirer 112 may discard the communication quality information acquired in the past and transmit a latest the communication quality information to the control signal generator 116.

FIG. 3 illustrates an example of the communication quality information acquired by the communication quality acquirer 112. When there is a plurality of control target devices 150, the communication quality information for each control target device 150 is acquired.

When the control signal generator 116 changes the control plan and generates a control signal, by referring to the communication quality information measured in the control target device 150 side and notified to the control device 100 as the communication quality information, it is possible to refer to the communication quality with higher accuracy, and to perform a control more efficiently while reducing a risk due to an operation.

Next, an example in which the control device 100 measures the communication quality will be described. In general, in a case where wireless communication is performed between two devices, it is known that there is a correlation between a communication quality in one direction and a communication quality in the opposite direction. In particular, it is known that this correlation is particularly high in wireless communication using time division multiplexing. From these, it can be said that the communication quality information measured by the communication quality measure 124 of the wireless communication circuit 104 is information corresponding to the communication quality information transmitted from the control target device 150 to the control device 100 and received by the wireless communication circuit 104.

The communication quality measure 124 receives the physical quantity signal transmitted from the control target device 150, and measures the communication quality between the control device 100 and the control target device 150 based on the received signal. The communication quality measure 124 transmits the communication quality information indicating the measured the communication quality to the communication quality acquirer 112 and the communication quality storage 120.

FIG. 9 is a flowchart of an operation in which the control device 100 measures the communication quality. A communication quality measuring operation of the control device 100 will be described with reference to FIG. 9.

The wireless communication circuit 154 receives the physical quantity signal transmitted from the control target device 150 (step S142).

The communication quality measure 124 measures a signal power, a noise power, and an interference power, obtains a reception power, a signal power-to-noise power ratio, and a signal power-to-interference power ratio, and transmits the reception power, the signal power-to-noise power ratio, and the signal power-to-interference power ratio to the processor 102 as the communication quality information (step S144).

The communication quality measure 124 measures a packet error rate and a communication disconnection probability, and transmits the measurement result to the processor 102 as the communication quality information (step S146).

The communication quality measure 124 measures a communication delay time, obtains a variation of communication delay time and a maximum value of the communication delay time, and transmits the variation of communication delay time and the maximum value of the communication delay time to the processor 102 as the communication quality information (step S148).

The communication quality measure 124 measures a communication distance and transmits the communication distance to the processor 102 as the communication quality information (step S152).

The communication quality acquirer 132 acquires the communication quality information transmitted from the wireless communication circuit 104, and transmits the acquired the communication quality information to the control signal generator 116.

Since the communication quality changes based on a movement of the control target device 150 or the like, the communication quality measure 124 measures the communication quality at regular time intervals, for example, one second intervals, and transmits the measured the communication quality information to the processor 102. At least a part of the measured the communication quality and the communication quality information transmitted in steps S144, S146, S148, and S152 may be omitted. In addition, the order of steps S144, S146, S148, and S152 may be partially changed.

Note that a measurement accuracy of the communication quality is also affected by the communication quality. For example, in a case where the communication quality is poor, it is expected that a measurement accuracy of the communication quality is also poor. For example, if a measurement is performed a plurality of times to obtain an average value or a measurement method is changed to lengthen the measurement time, the measurement accuracy may be improved. Therefore, when the communication quality is poor, measurement may be performed by changing to a measurement method capable of improving the measurement accuracy.

Based on the communication quality information and the risk evaluation value information, the control signal generator 116 changes the control plan as necessary, and generates a control signal indicating the changed control plan.

By referring to the communication quality information measured by the communication quality measure 124 as the communication quality information when the control signal generator 116 generates the control signal, it is possible to omit control necessary for causing the control target device 150 to measure the communication quality or notify the communication quality. It is possible to obtain an effect of simplifying the control. In addition, since the wireless communication circuit 104 having a connection relationship closer to the processor 102 than the control target device 150 includes the communication quality measure 124, the processor 102 can acquire the communication quality faster and can refer to the latest the communication quality. Therefore, in a situation where a change in the communication quality is faster, an effect of easily following the change can be obtained.

The control system 300 only needs to include either or both of the communication quality measure 124 and the communication quality measure 162 as the communication quality measure. Both the measures 124 and 162 may be provided, and the measurement may be performed in cooperation with each other. The communication quality can be measured with higher accuracy than a measurement, performed only with one of the communication quality measures 124 and 162, by measuring the communication quality in cooperation with each other. For example, the communication disconnection probability can be calculated with higher accuracy by calculating the communication disconnection probability in consideration of an adjustment that can be made to improve the communication quality in both communication directions in addition to the current the communication quality.

The processor 102 also includes the communication quality estimator 122. The communication quality estimator 122 estimates the communication quality based on information stored in the communication quality storage 120.

FIG. 10 illustrates an example of the communication quality information stored in the communication quality storage 120. In a case where the control system 300 includes a plurality of control target devices 150, the communication quality storage 120 stores the communication quality information measured in a past predetermined time for each control target device 150. The communication quality storage 120 stores the communication quality information in association with time, position, and direction data. Times t1, t2, t3, . . . are measurement times of the communication quality.

The position and the direction are obtained from the physical quantity signal transmitted from the control target device 150. The physical quantity signal indicates coordinates (latitude and longitude) of a position of a specific part of the control target device 150. The communication quality storage 120 associates a position of the antenna 152 and a direction of a main lobe of the antenna 152 with the communication quality information. Since a relationship between the position of the antenna 152 and a specific portion whose position is indicated by the physical quantity signal is known, coordinates of the position of the antenna 152 is obtained from the coordinate of the specific portion. The position may be expressed by latitude and longitude, but in the example of FIG. 10, the latitude and longitude are converted into coordinates (x, y) in a local x-y space of a movement range of the control target device 150.

The physical quantity signal indicates a direction (a direction of north, south, east, or west) of the control target device 150. The communication quality storage 120 associates the direction of the antenna 152 with the communication quality information. The antenna 152 may include either a directional antenna or an omnidirectional antenna. Even in a case where the antenna 152 is configured by an omnidirectional antenna, the antenna has a main lobe. The antenna 152 may be arranged on the control target device 150 such that a direction of the main lobe coincides with a traveling direction of the control target device 150, or may be arranged on the control target device 150 in an arbitrary direction of the control target device 150. Since the relationship between the direction of the main lobe of the antenna 152 and the direction of the control target device 150 indicated by the physical quantity signal is known, a direction of a main lobe of the antenna 152 is obtained from the direction of the control target device 150. The direction may be represented by a direction of north, south, east, or west, but in the example of FIG. 10, the direction is converted into an angle of 0 degrees to 360 degrees in which the x-axis in the local x-y space in the movement range of the control target device 150 is set to 0 degrees and the y-axis is set to 90 degrees.

The speed and the acceleration may be included in the physical quantity signal, but the speed may be obtained by calculation from a change amount of the position of the control target device 150 and time required for the change, and the acceleration may be obtained by calculation from a change in the speed.

Note that it is not essential to associate the position and the direction with the communication quality information, and the communication quality storage 120 may store the communication quality information in association with only the time.

The communication quality storage 120 includes a memory such as, for example, a random access memory (RAM), a programmable ROM (PROM), an erasable PROM (EPROM), electrically EPROM (EEPROM), a flash memory, and a register. Note that the communication quality storage 120 may be provided not only inside the processor 102 but also outside the processor 102 or the control device 100. In a case where the communication quality storage 120 is provided outside the processor 102 or the control device 100, the communication quality storage 120 may be a cloud that stores information via the Internet.

The communication quality referred to when the control signal generator 116 generates the control signal is a past the communication quality with respect, to the generated control signal. The communication quality estimator 122 can estimate a current or future the communication quality based on a change in the past the communication quality information read from the communication quality storage 120 and a signal from the control signal generator 116. For example, in a case where the communication quality decreases (or deteriorates) with a lapse of time, the communication quality estimator 122 estimates that the current or future the communication quality is equal to or lower than (or worse than) the latest the communication quail by.

The communication quality information indicating the communication quality estimated by the communication quality estimator 122 is transmitted to the communication quality acquirer 112. The communication quality acquirer 112 acquires either the communication quality information transmitted from the communication quality estimator 122 or the communication quality information transmitted from the wireless communication circuit 104, and transmits the acquired the communication quality information to the control signal generator 116.

The communication quality storage 120 and the communication quality estimator 122 can be omitted.

Another two examples of an estimation method of the communication quality estimator 122 will be described.

As illustrated in FIG. 10, the communication quality storage 120 stores the communication quality in association with coordinate information such as the position and the direction of the control target device 150 (or the antenna 152 of the control target device 150). Therefore, the communication quality estimator 122 may estimate, as the current or future the communication quality, the communication quality that matches the current or future coordinate information of the control target device 150, or is associated with coordinate information closest to the current or future coordinate information of the control target device 150. For example, when the communication quality stored in association with coordinates of a certain area is low, the communication quality estimator 122 estimates that the communication quality of the control target device 150 located in the area (or up to a vicinity thereof) is also low.

Furthermore, the communication quality of wireless communication generally decreases when there exists an object that shields radio waves such as a wall in a communication path. Therefore, the communication quality estimator 122 can also estimate the communication quality of the current or future control target device 150 using geographic information that allows the position of the object or the like in the communication path to be known and the coordinate information of the current or future control target device 150.

The configurations of the control device 100 and the control target device 150 have been described above.

In the control device 100, at least a part of the processor 102 may include an integrated circuit (IC), a large scale integration (LSI), or the like. Furthermore, the processor 102 may be one or more electronic circuits including a control device and an arithmetic device.

Also, in the control target device 150, at least a part of the controller 156, the actuator 153, the measure 166, and the signal generator 168 may be implemented by an integrated circuit such as an IC or an LSI. The controller 156 and/or the signal generator 168 may be one or more electronic circuits including a control device and an arithmetic device.

The electronic circuit is realized by an analog or digital circuit or the like. For example, a general-purpose processor, a central processing unit (CPU), a microprocessor, a digital, signal processor (DSP), an application specific IC (ASIC), a field programmable gate array (FPGA), and a combination thereof are possible.

Next, an operation example of the control signal generator 116 will be described.

Figure 11:
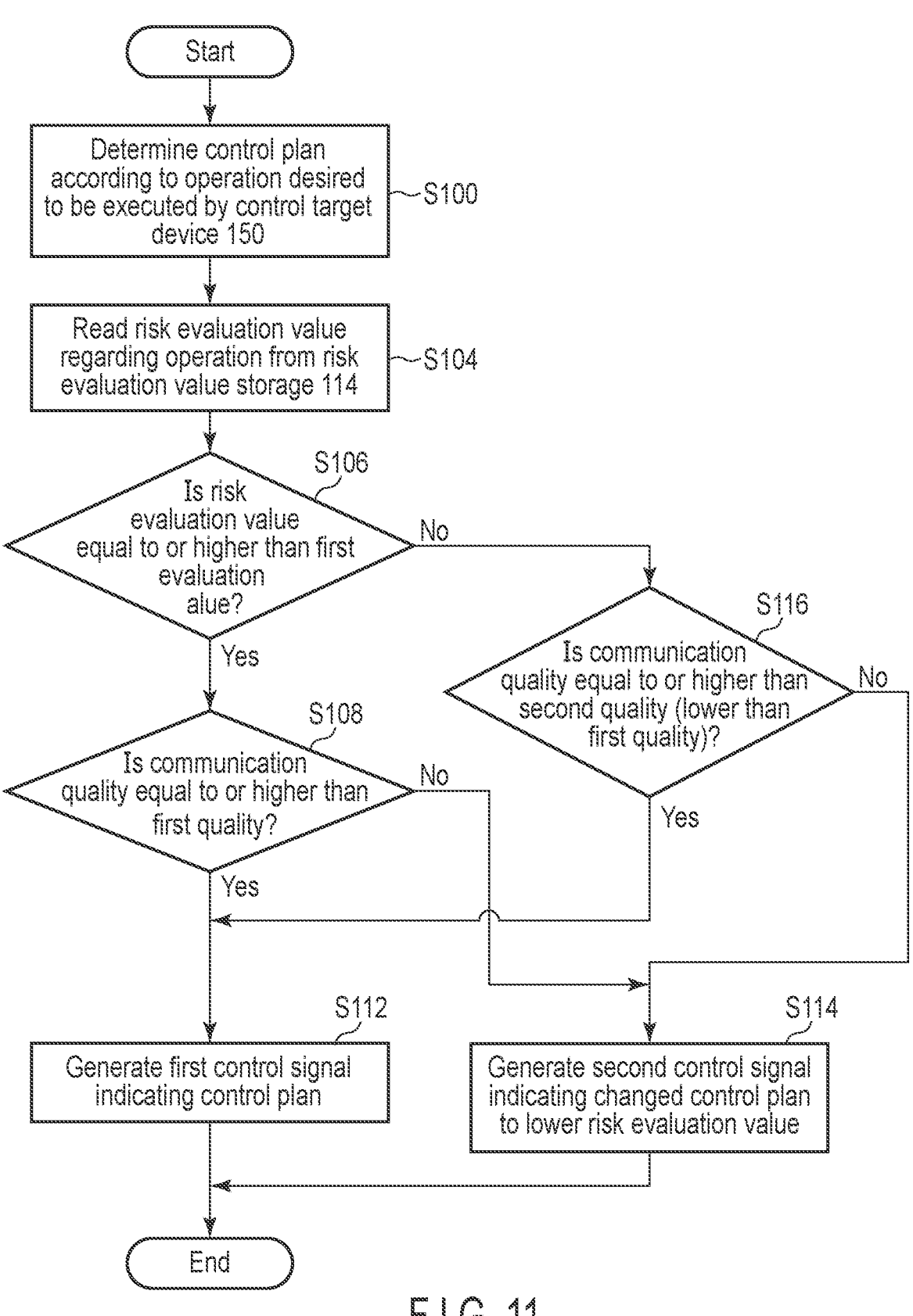
FIG. 11 is a flowchart of a first operation example in the control signal generator according to the first embodiment.

FIG. 11 is a flowchart of a first operation example in the control signal generator 116. A first operation example in which the control signal generator 116 generates a control signal for instructing a certain operation will be described with reference to FIG. 11.

The control signal generator 116 determines a control plan according to an operation to be executed by the control target device 150 (step S100).

The control signal generator 116 reads a risk evaluation value regarding the operation from the risk evaluation value storage 114 (step S104).

The control signal generator 116 determines whether the risk evaluation value is equal to or higher than a first evaluation value (for example, 10,000 yen) (step S106). When the risk evaluation value is equal to or higher than the first evaluation value (step S106, Yes), the process proceeds to step S108. When the risk evaluation value is not higher than the first evaluation value (step S106, No), the process proceeds to step S116.

The control signal generator 116 determines whether the communication quality acquired by the communication quality acquirer 112 is higher (or better) than the first quality (step S108). For example, in a case where a packet error rate is used as the communication quality, the control signal, generator 116 determines whether the packet error rate is lower than 1% (first quality) (the quality is higher than 1%). If the communication quality is higher than the first quality (for example, if the packet, error rate is lower than 1%) (step S108, Yes), the process proceeds to step S112. If the communication quality is not higher than the first quality (for example, when the packet error rate is 1% or more) (step S108, No), the process proceeds to step S114.

If a determination result in step S106 is No, the control signal generator 116 determines whether the communication quality is higher than a second quality (step S116). The second quality is lower than (or worse than) the first quality used as a reference for determining whether the communication quality is high or low in step S108. For example, in the case that a packet error rate is used as the communication quality, the control signal generator 116 determines whether the packet error rate is lower than 10% (second quality). If the communication quality is equal to or higher than the second quality (for example, when the packet error rate is lower than 10%) (step S116, Yes), the process proceeds to step S112. If the communication quality is not higher than the second quality (for example, when the packet error rate is 10% or more) (step S108, No), the process proceeds to step S114.

The control signal generator 116 generates a first control signal indicating the control plan (step S112).

The control signal generator 116 changes the control plan to lower the risk evaluation value, and generates a second control signal indicating the changed control plan (step S114).

As described above, the control signal generator 116 generates the first control signal indicating the control plan determined according to the operation or the second control signal indicating the control plan changed to lower the risk evaluation value according to the risk evaluation value and the communication quality.

Figure 12:
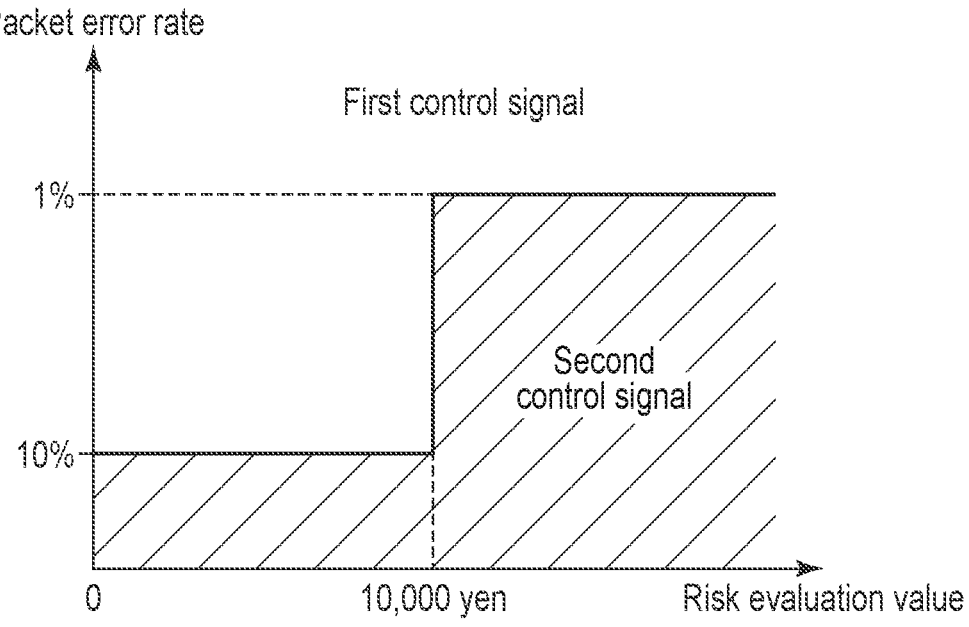
FIG. 12 illustrates a relationship among two types of the control signals, the risk evaluation value, and the communication quality according to the first embodiment.

FIG. 12 illustrates a relationship among two types of control signals generated by the processing of FIG. 11, the risk evaluation value, and the communication quality. The horizontal axis represents the risk evaluation value. The vertical axis indicates a degree of the communication quality. The vertical axis indicates higher quality (better quality) as it goes up. For example, in the case that a packet error rate is used as the communication quality, the lower the numerical value indicating the error rate (for example, 1%), the higher the quality, and the higher the numerical value indicating the error rate (for example, 10%), the lower the quality. That is, in the case of using the packet, error rate as the communication quality, the numerical value itself decreases as it goes up along the vertical axis.

In a case where the risk evaluation value is the first evaluation value (for example, 10,000 yen) or more, if the communication quality is higher than the first quality (for example, when the packet error rate is lower than 1%), the control signal generator 116 generates the first control signal indicating a control plan initially determined according to the operation. If the communication quality is not higher than the first quality (for example, when the packet error rate is 1% or more), the control signal generator changes the control plan to lower the risk evaluation value, and generates the second control signal indicating the changed control plan.

In a case where the risk evaluation value is lower than the first evaluation value (for example, 10,000 yen), the control signal generator 116 generates the first control signal if the communication quality is higher than the second quality lower than the first quality (for example, when the packet error rate is lower than 10%), or generates the second control signal if the communication quality is not higher than the second quality (for example, when the packet error rate is 10% or more).

That is, the communication quality as a reference for determining whether to generate the second control signal for lowering the risk evaluation value or re-generate the normal first control signal is differently considered between an operation with a high risk evaluation value and an operation with a lower risk evaluation value. In a case of generating a control signal for an operation having a low risk evaluation value, the control signal generator 116 determines not to generate the second control signal unless the communication quality is considerably deteriorated. However, in a case of generating a control signal for an operation having a high risk evaluation value, the control signal generator determines to generate the second control signal for lowering the risk evaluation value when the communication quality is deteriorated even slightly.

Thereby, it is possible to generate a control signal in consideration of an appropriate the communication quality according to a risk of an operation using the communication quality and the risk evaluation value, and thus, it is possible to more efficiently control the operation of the control target device 150.

Figure 13:
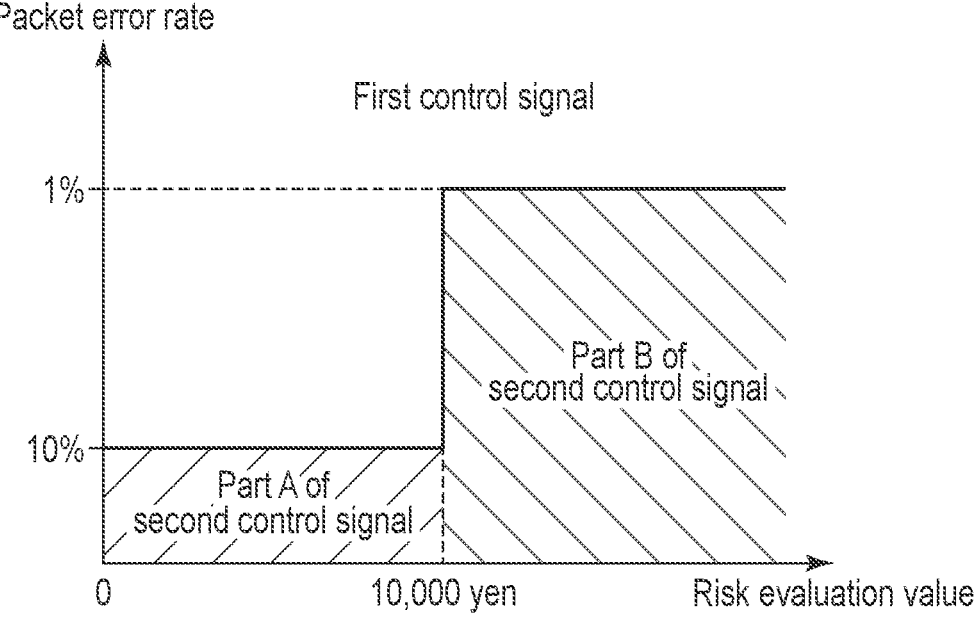
FIG. 13 illustrates another relationship among two types of the control signals, the risk evaluation value, and the communication quality according to the first embodiment.

In the above description, the second control signal is a type of signal that lowers the risk evaluation value by a certain value relative to the first control signal. However, a plurality of types of second control signals may be generated by changing a degree of lowering the risk evaluation value according to the risk evaluation value. For example, as illustrated in FIG. 13, in a case where the risk evaluation value is the first evaluation value (for example, 10,000 yen) or more, the control signal generator 116 may generate the first control signal indicating a control plan initially determined according to an operation if the communication quality is higher than the first quality (for example, when a packet error rate is lower than 1%), or may change the control plan to lower the risk evaluation value by a second predetermined value if the communication quality is not higher than the first quality (for example, when the packet error rate is 1% or more), and may generate a part B of the second control signal indicating the changed control plan.

In a case where the risk evaluation value is lower than the first evaluation value (for example, 10,000 yen), the control signal generator 116 may generate the first control signal if the communication quality is higher than the second quality lower than the first quality (for example, when the packet error rate is lower than 10%). In a case where the communication quality is not higher than the second quality (for example, when the packet error rate is 10% or more), the control signal generator may change the control plan to lower the risk evaluation value by a first predetermined value, and generate a part A of the second control signal indicating the changed control plan.

The first predetermined value is higher than the second predetermined value. That is, an operation instructed by the part A of the second control signal has a smaller risk evaluation value than a risk evaluation value of an operation instructed by the part B of the second control signal.

The control plan for lowering the risk evaluation value referred to in step S114 of FIG. 11 may be a control plan for causing the control target device 150 to perform an operation for suppressing a value of risk information or an occurrence probability of a risk to a certain value or lower. Note that the risk evaluation value may directly include a degree of a risk caused by the communication quality or an occurrence probability of such a risk. The degree of a risk or the occurrence probability of a risk may be calculated from the risk evaluation value. By referring to these items of information and the communication quality, it is possible to adjust the operation of the control target device 150 to suppress the degree or occurrence probability on the risk to be generated to a certain level or lower.

A modification example of the control plan for causing the control target device 150 to perform an operation for suppressing the value of the risk information or the occurrence probability of the risk to a certain value or lower will be described below.

In an operation of moving the control target device, the risk evaluation value includes a damage risk that comes from a contact with the surroundings or another control target device to damage the other area or the own device. In order to suppress the risk evaluation value of the damage risk to a certain value or lower according to the communication quality, for example, in a case where the communication quality is lower than a certain quality, the control plan may be changed to decrease a moving speed of the control target device. When a moving speed is included in the control plan, the moving speed can be easily changed. Even if the moving speed is not included in the control plan, when a target position is included therein, the moving speed can be decreased by reducing an amount of a change in the target position between each of control plans at regular time intervals.

In the operation of passing through a narrow passage, the risk evaluation value includes risk information indicating that the damage risk due to a contact with the passage or contact with another device is higher. In order to suppress the risk evaluation value of the contact risk to a certain value or lower according to the communication quality, for example, in a case where the communication quality is lower than a certain quality, the control plan may be changed to select another route that, does not need to pass through a narrow passage even if the route is a detour route. As a result, the value of the risk information or the occurrence probability of the risk can be suppressed to a certain value or lower.

In an operation in which the control target device 150 is a large conveyance device and the control target device 150 conveys a load, the risk evaluation value includes a damage risk that the control target device 150 comes into contact with something during a conveyance of the load and damages the load being conveyed. In such a case, when a similar operation is performed by a smaller conveyance device, the risk evaluation value includes risk information indicating that a degree of such risk is smaller. In a case where the risk evaluation value exceeds a certain value during the conveyance of the load by the large conveyance device, for example, the control plan may be changed to a control plan in which the conveyance of the load is substituted by the small conveyance device instead of the large conveyance device.

In a similar operation, in a case where there is a risk that the risk evaluation value becomes a certain value or more while the load is being conveyed to a target place, the control plan may be changed to notify a warehouse manager or a person in charge of loading/unloading of a message for interrupting the conveyance of the load by voice or light. In addition, in an operation in which a person is waiting at a destination, the control plan may be changed so that a message prompting the person to receive a package is notified by voice, light, or the like.

The control plan may be changed to temporarily stop the operation, for example. It is known that the communication quality changes with time, and even when the communication quality temporarily decreases at a certain time, the communication quality may be recovered with a lapse of time instead of immediately switching a control signal to be generated from the first control signal to the second control signal, and the first control signal only needs to be generated instead of the second control signal in some cases. In such a case, it is effective to temporarily stop the generation of the control signal and cause the control target device 150 to stand by for the operation until the communication quality is recovered.

Figure 14:
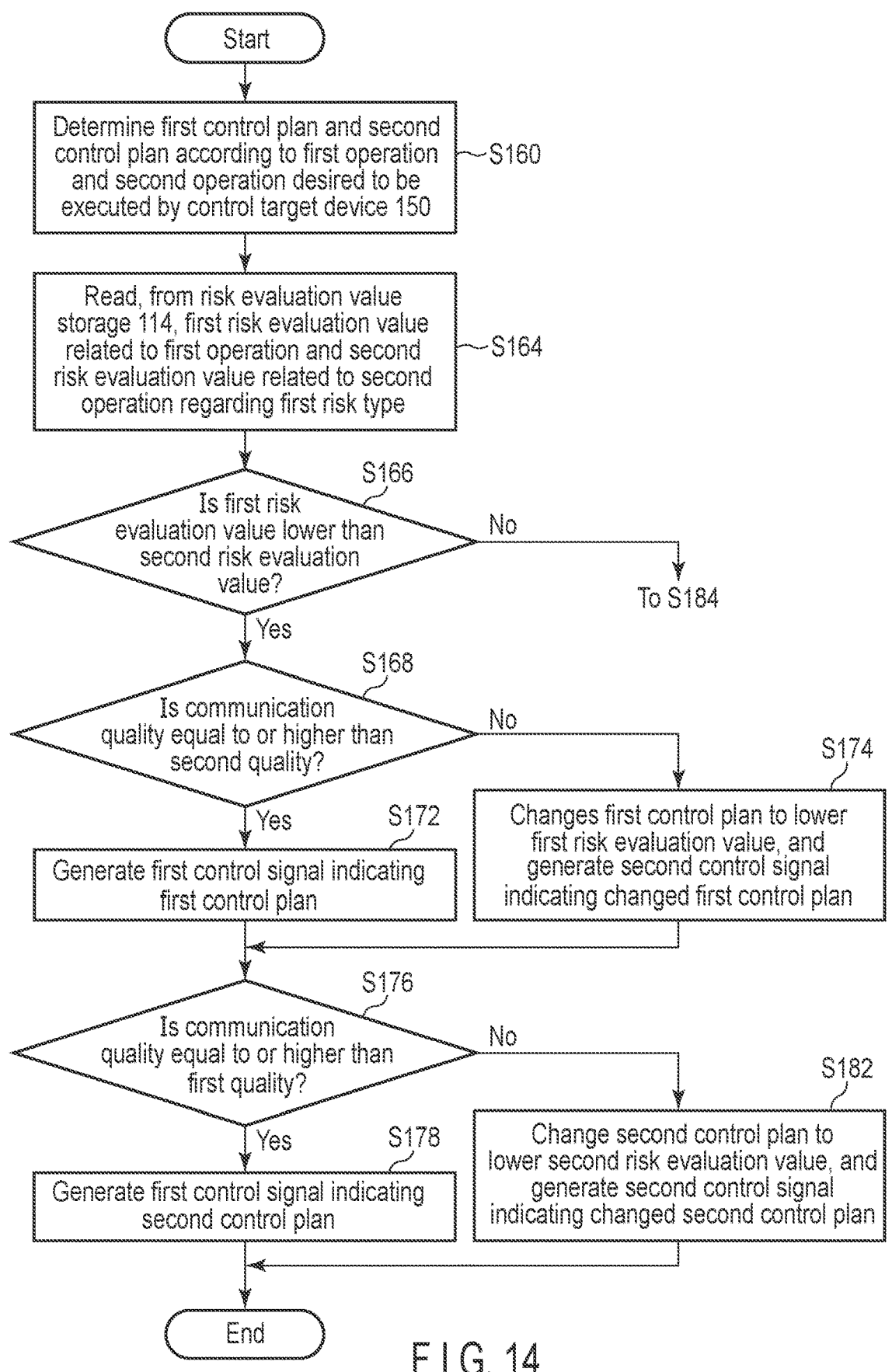
FIG. 14 shows a flowchart of a second operation example in the control signal generator according to the first embodiment.

FIGS. 14 and 15 show a flowchart of a second operation example in the control signal generator 116. A second process in which the control signal generator 116 generates a control signal instructing two operations will be described with reference to FIGS. 14 and 15.

In the first operation example illustrated in FIG. 11, the control device 100 instructs the control target device 150 to perform a single operation, and the control signal generator 116 changes the communication quality, which is a criterion for determining whether to generate the first control signal or the second control signal, depending on whether the risk information related to the single operation is equal to or higher than the first evaluation value or lower than the first evaluation value.

In the second operation example, the control device 100 instructs the control target device 150 to perform two operations in time series. The two operations are operations that can generate a risk of a certain, risk type, and risk evaluation values regarding the two opera-ions for the certain risk type are different.

The control signal generator 116 determines a first control plan and a second control plan according to a first operation and a second operation to be executed by the control target device 150 (step S160).

The control signal generator 116 reads a first risk evaluation value related to the first operation and a second risk evaluation value related to the second operation regarding a first risk type from the risk evaluation value storage 114 (step S164).

The control signal generator 116 determines whether the first risk evaluation value is lower than the second risk evaluation value (step S166). If the first risk evaluation value is lower than the second risk evaluation value (step S166, Yes), the process proceeds to step S168. If the first risk evaluation value is equal to or higher than the second risk evaluation value (step S166, No), the process proceeds to step S184.

The control signal generator 116 determines whether the communication quality acquired by the communication quality acquirer 112 is higher (or better) than the second quality (step S168). If the communication quality is higher than the second quality (step S168, Yes), the process proceeds to step S172. If the communication quality is not higher than the second quality (step S168, No), the process proceeds to step S174.

The control signal generator 116 generates the first control signal indicating the first control plan (step S172).

The control signal generator 116 changes the first control plan to lower the first risk evaluation value, and generates the second control signal indicating the changed first control plan (step S174).

The control device 100 transmits the control signal generated in step S172 or step S174 to the control target device 150. When the control device 100 detects completion of execution of an operation according to the control signal of the control target device 150, the process proceeds to step S176.

The control signal generator 116 determines whether the communication quality acquired by the communication quality acquirer 112 is higher than the first quality (step S176). The first quality is higher (or better) than the second quality used as a reference for determining whether the communication quality is high or low in step S168. If the communication quality is higher than the first quality (step S176, Yes), the process proceeds to step S178. If the communication quality is not higher than the first quality (step S176, No), the process proceeds to step S182.

The control signal generator 116 generates the first control signal indicating the second control plan (step S178).

The control signal generator 116 changes the second control plan to lower the second risk evaluation value, and generates the second control signal indicating the changed second control plan (step S132).

If the determination result in step S166 is No, the control signal generator 116 determines whether the communication quality acquired by the communication quality acquirer 112 is higher (or better) than a third quality (step S184). The third quality may be equal to the first quality or may be any quality. If the communication quality is higher than the third quality (step S184, Yes), the process proceeds to step S186. If the communication quality is not higher than the third quality (step S184, No), the process proceeds to step S188.

The control signal generator 116 generates the first control signal indicating the first control plan (step S186).

The control signal generator 116 changes the first control plan to lower the first risk evaluation value, and generates the second control signal indicating the changed first control plan (step S188).

After the process of step S186 or step S188, the process proceeds to step S192.

The control device 100 transmits the control signal generated in step S186 or step S188 to the control target device 150. When the control device 100 detects completion of execution of an operation according to the control signal of the control target device 150, the process proceeds to step S192.

The control signal generator 116 determines whether the communication quality acquired by the communication quality acquirer 112 is higher than a fourth quality (step S192). The fourth quality is lower (or worse) than the third quality used as a reference for determining whether the communication quality is high or low in step S184. The fourth quality may be equal to the second quality or any quality lower than the third quality. If the communication quality is higher than the fourth quality (step S192, Yes), the process proceeds to step S194. If the communication quality is not higher than the fourth quality (step S192, No), the process proceeds to step S196.

The control signal generator 116 generates the first control signal indicating the second control plan (step S194).

The control signal generator 116 changes the second control plan to lower the second risk evaluation value, and generates the second control signal indicating the changed second control plan (step S196).

In this manner, the control signal generator 116 generates the first control signal indicating the first control plan determined according to the first operation or the second control signal indicating the first control plan changed to lower the risk evaluation value according to the risk evaluation value and the communication quality. In addition, the control signal generator 116 generates the first control signal indicating the second control plan determined according to the second operation or the second control signal indicating the second control plan changed to lower the risk evaluation value according to the risk evaluation value and the communication quality.

When generating a control signal for an operation with a high risk evaluation value, the control signal generator 116 generates the second control signal for lowering the risk, evaluation value in a case where the communication quality is not higher than the third quality or the fourth quality. When generating a control signal for an operation in which the risk evaluation value is not large, the control signal generator 116 generates the second control signal in a case where the communication quality is not higher than the first quality or the second quality.

Next, a specific example of the second operation will be described. As a specific example, an example in which the first operation is an operation of moving through a wide passage, the second operation is an operation of moving through a narrow passage, and the packet error rate is used as the communication quality will be described. Both the first operation and the second operation can generate a peripheral collision risk. The risk evaluation value for the peripheral collision risk is different between the first operation and the second operation.

Figure 17:
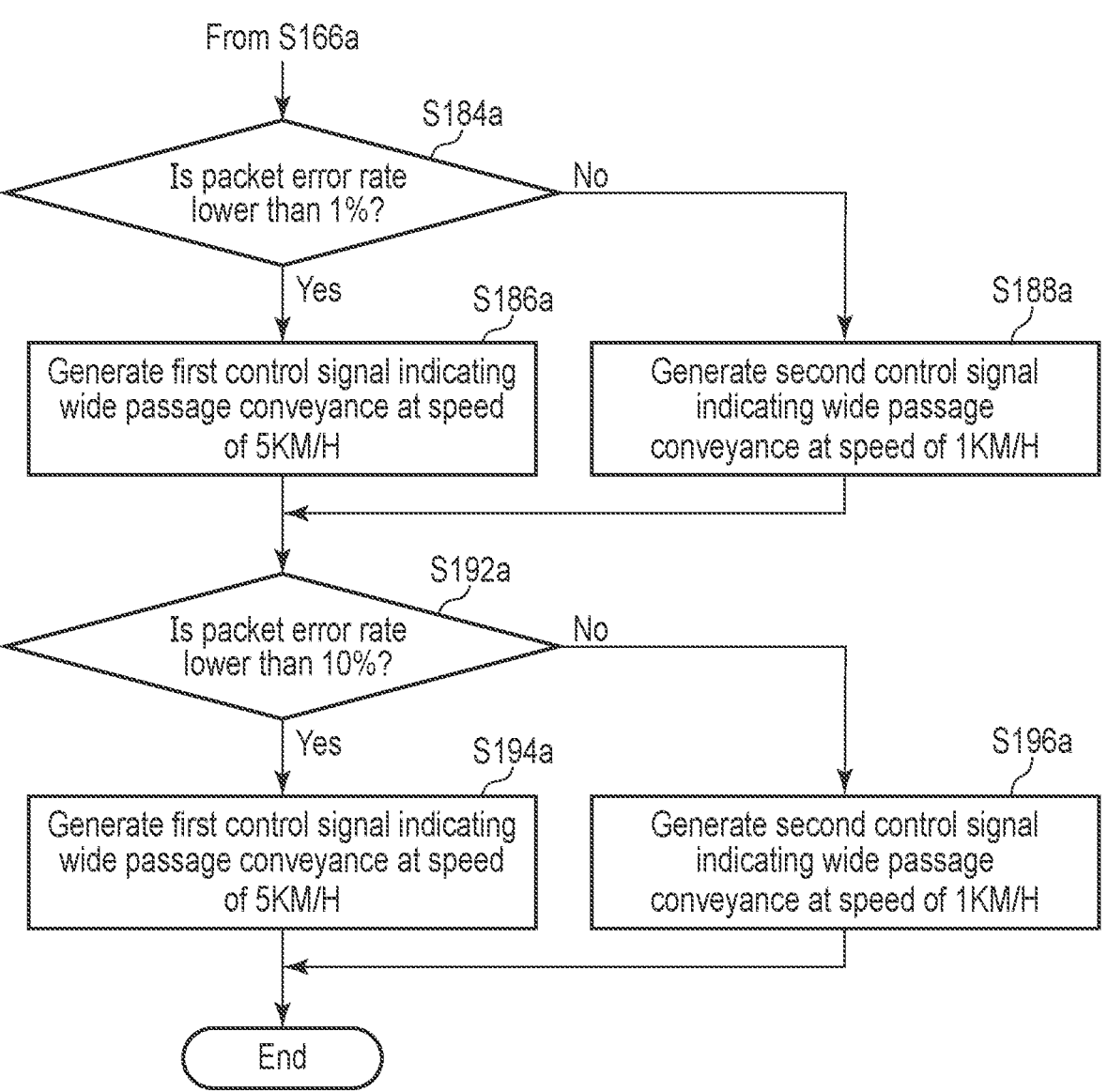
FIG. 17 shows a flowchart of a specific example of the second operation in the control signal generator according to the first embodiment.

FIGS. 16 and 17 show a flowchart of a specific example of the second operation in the control signal generator 116. A second process in which the control signal generator 116 generates a control signal instructing two operations will be described specifically with reference to FIGS. 16 and 17.

The control signal generator 116 determines a first control plan according to the wide passage conveyance (first operation) and a second control plan according to the narrow passage conveyance (second operation) to be executed by the control target device 150 (step S160a). A moving speed of the control target device 150 in the first control plan and the second control plan is 5 KM/H.

The control signal generator 116 reads a first risk evaluation value related to the wide passage conveyance and a second evaluation, value related to the narrow passage conveyance for the peripheral collision risk from the risk evaluation value storage 114 (step S164a).

The control signal generator 116 determines whether the first evaluation value is lower than the second evaluation value (step S166a). If the first evaluation value is lower than the second evaluation value (step S166a, Yes), the process proceeds to step S168a. If the first evaluation value is equal to or higher than the second evaluation value (step S166a, No), the process proceeds to step 6184a.

Here, it is assumed that the first evaluation value related to the wide passage conveyance with respect to the peripheral collision risk is lower than the second evaluation value related to the narrow passage conveyance. The control signal generator 116 determines whether or not the packet error rate acquired by the communication quality acquirer 112 is lower than 10% (step S168a). If the packet error rate is lower than 10% (step S168a, Yes), the process proceeds to step S172a. If the packet error rate is 10% or more (step S168a, No), the process proceeds to step S174a.

The control signal generator 116 generates the first control signal indicating the wide passage conveyance at a speed of 5 KM/H as in the first control plan (step S172a).

The control signal generator 116 generates the second control signal indicating the wide passage conveyance at a speed of 1 KM/H in which the moving speed of the first control plan is decreased (step S174a).

The control device 100 transmits the control signal generated in step S172a or step S174a to the control target device 150. When the control device 100 detects a completion of the execution of an operation corresponding to the control signal of the control target device 150, the process proceeds to step S176a.

The control signal generator 116 determines whether or not the packet error rate acquired by the communication, quality acquirer 112 is lower than 1% (step S176a). The packet error rate of 1% indicates that the communication quality is better than the packet error rate (10%) used as a reference for determining the quality of the packet error rate in step S168a. If the packet error rate is lower than 1% (step S176a, Yes), the process proceeds to step S178a. If the packet error rate is 1% or more (step S176a, No), the process proceeds to step S182a.

The control signal generator 116 generates the first control signal indicating the narrow passage conveyance with the speed of 5 KM/H as in the second control plan (step S178a).

The control signal generator 116 generates the second control signal indicating the narrow passage conveyance at a speed of 1 KM/H in which the moving speed of the second control plan is decreased (step S182a).

Next, a case where the first risk evaluation value is not lower than the second risk evaluation value will be described. That is, when the determination result in step S166a is No, the control signal generator 116 determines whether or not the packet error rate acquired by the communication quality acquirer 112 is lower than 1% (step S184a). Note that the packet error rate (1%) used as a reference for determining whether the packet error rate is good or bad in step S134a is equal to the packet error rate (1%) used as a reference for determining whether the packet error rate is good or bad in step S176a, but any error rate may be used. If the packet error rate is lower than 1% (step S184a, Yes), the process proceeds to step S186a. If the packet error rate is 1% or more (step S184a, No), the process proceeds to step S188a.

The control signal generator 116 generates the first control signal indicating the wide passage conveyance at the movement speed of 5 KM/H as in the first control plan (step S186a).

The control signal generator 116 generates the second control signal indicating the wide passage conveyance at a speed of 1 KM/H in which the moving speed of the first control plan is decreased (step S183a).

The control device 100 transmits the control signal generated in step S186a or step S188a to the control target device 150. When the control device 100 detects a completion of the execution of an operation corresponding to the control signal of the control target device 150, the process proceeds to step S192a.

The control signal generator 116 determines whether or not the packet error rate acquired by the communication quality acquirer 112 is lower than 10% (step S192a). Note that the packet error rate (10%) used as a reference for determining whether the packet error rate is good or bad in step S192a is equal to the packet error rate (10%) used as the reference for determining whether the packet error rate is good or bad in step S168a, but an arbitrary error rate worse than the packet error rate (1%) used as the reference for determining whether the packet error rate is good or bad in step S184a may be used. If the packet error rate is lower than 10% (step S192a, Yes), the process proceeds to seep S194a. If the packet error rate is 10% or more (step S192a, No), the process proceeds to step S196a.

The control signal generator 116 generates the first control signal indicating the narrow passage conveyance at the movement speed of 5 KM/H as in the second control plan (step S194a).

The control signal generator 116 generates the second control signal indicating the narrow passage conveyance at a speed of 1 KM/H in which the moving speed of the second control plan is decreased (step S196a).

FIGS. 18A and 18B illustrate the control signals generated in the second specific example illustrated in FIGS. 16 and 17.

When generating the control signal of the wide passage conveyance (first operation) in which the risk evaluation value of the peripheral collision risk is smaller than that of the narrow passage moving operation, as illustrated in FIG. 18A, the control signal generator 116 generates the first control signal indicating the first control plan in a case where the packet error rate is not worse than 10%, or generates the second control signal indicating a control plan in which the moving speed of the first control plan is decreased, in a case where the packet error rate is worse than 10%.

When generating the control signal of the narrow passage conveyance (second operation) in which the risk evaluation value of the peripheral collision risk is higher than that of the wide passage moving operation, as illustrated in FIG. 18B, the control signal generator 116 generates the first control signal indicating the second control plan in a case where the packet error rate is not worse than 1%, and generates the second control signal indicating a control plan in which the moving speed of the second control plan is decreased, in a case where the packet error rate is worse than 1%.

FIG. 19 is a flowchart of a third operation example in the control signal generator 116. A third process in which the control signal generator 116 generates the control signal instructing two operations will be described with reference to FIG. 19.

In the second operation example illustrated in FIGS. 14 and 15, the control device 100 instructs the control target device 150 to perform two operations in time series. The two operations are operations in which a risk evaluation value of a certain risk type is different.

In the third operation example, the control device 100 instructs the control target device 150 to perform two operations in time series. The two operations are operations that can generate different types of risks.

The control signal generator 116 determines a first control plan and a second control plan according to a first operation and a second operation to be executed by the control target device 150 (step S200).

The control signal generator 116 reads a first risk evaluation value related to the first operation regarding a first, risk type and a second risk evaluation value related to the second operation regarding a second risk type from the risk evaluation value storage 114 (step S204).

The control signal generator 116 determines whether the first risk evaluation value is lower than the second risk evaluation value (step S206). If the first evaluation is lower than the second evaluation (step S206, Yes), the process proceeds to step S168 (FIG. 14). If the first evaluation value is equal to or higher than the second evaluation value (step S206, No), the process proceeds to step S184 (FIG. 15).

The subsequent processing is the same as the third process illustrated in FIGS. 14 and 15.

In this manner, the communication quality as a criterion for determining whether the control signal generator 116 generates the first control signal indicating a control plan determined according to the operation or the second control signal indicating a control plan changed to lower the risk evaluation value, is changed according to the risk evaluation value. That is, in a case where the first operation can generate a first type of the risk, the second operation can generate a second type of the risk, and the risk evaluation value of the first type of the risk is higher than the risk evaluation value of the second type of the risk, when generating a control signal for the first operation, the control signal generator 116 generates the first control signal or the second control signal depending on whether the communication quality is higher than the first quality. When generating a control signal for the second operation, the control signal generator 116 generates the first control signal or the second control signal depending on whether the communication quality is higher than the second quality. The second quality is higher than the first quality.

As a specific example, an example in which the first operation is an operation of conveying a package, the second operation is an operation of unloading the package and placing the package at a destination, and a packet error rate is used as the communication quality will be described. It is assumed that each of the first operation and the second operation can generate a plurality of risks (see FIGS. 5A and 5B), the risk evaluation value of a peripheral collision risk is the largest in the risk evaluation value for each risk type of the first operation, and the risk evaluation value on a risk of load damage is the largest in the risk evaluation value for each risk type of the second operation.

In this case, when generating a control signal for an operation with a small risk evaluation value, the control plan may be changed to decrease the moving speed when the packet, error rate exceeds 10%, and when generating a control signal for an operation with a high risk evaluation value, the control plan may be changed to decrease the unloading speed when the packet error rate exceeds 1%.

FIGS. 20 and 21 show a flowchart of a third specific operation example in the control signal generator 116. A specific second process in which the control signal generator 116 generates a control signal instructing two operations will be described with reference to FIGS. 20 and 21.

The control signal generator 116 determines a first control plan according to a load conveyance (first operation) to be executed by the control target device 150 and a second control plan according to an unloading (second operation) (step S200a). A moving speed of the control target device 150 in the first control plan is 5 KM/H, and an unloading speed of the control target device 150 in the second control plan is 1 unit per minute (1/M).

The control signal generator 116 reads, from the risk evaluation value storage 114, a first risk evaluation value related to load conveyance regarding a peripheral collision risk, which is a maximum value among risk evaluation values for the load conveyance, and a second risk evaluation value related to unloading regarding a risk of lead damage, which is a maximum value among risk evaluation values for the unloading (step S204a).

The control signal generator 116 determines whether the first risk evaluation value is lower than the second risk evaluation value (step S206a). If the first risk evaluation value is lower than the second risk evaluation value (step S206a, Yes), the process proceeds to step S208a. If the first, risk evaluation value is equal to or higher than the second risk evaluation value (step S206a, No), the process proceeds to step S224a.

Here, it is assumed that the first risk evaluation value related to the load conveyance regarding the peripheral collision risk is lower than the second risk evaluation value related to the unloading regarding the risk of load damage. The control signal generator 116 determines whether or not a packet error rate acquired by the communication quality acquirer 112 is lower than 10% (step S208a). If the packet error rate is lower than 10% (step S208a, Yes), the process proceeds to step S212a. If the packet error rate is 10% or more (step S208a, No), the process proceeds to step S214a.

The control signal generator 116 generates the first control signal indicating the load conveyance with a movement speed of 5 KM/H as in the first control plan (step S212a).

The control signal generator 116 generates the second control signal indicating the load conveyance at a speed of 1 KM/H in which the moving speed of the first control plan is decreased (step S214a).

The control device 100 transmits the control signal generated in step S212a or step S214a to the control target device 150. When the control device 100 detects a completion of the execution of an operation corresponding to the control signal of the control target device 150, the process proceeds to step S216a.

The control signal generator 116 determines whether or not a packet error rate acquired by the communication quality acquirer 112 is lower than 1% (step S216a). The packet error rate of 1% is better quality than the packet error rate (10%) used as a reference for determining whether the packet error rate is good or bad in step S208a. If the packet error rate is lower than 1% (step S216a, Yes), the process proceeds to step S218a. If the packet error rate is 1% or more (step S216a, No), the process proceeds to step S222a.

The control signal generator 116 generates the first control signal indicating unloading at a speed of 1 unit per minute (1/M) as in the second control plan (step S218a).

The control signal generator 116 generates the second control signal indicating unloading at a speed of 0.1 units per minute (0.1/M) in which the speed of the second control plan is decreased (step S222a).

Next, a case will be described in which the first, risk evaluation value related to the load conveyance regarding the peripheral collision risk is not lower than the second risk evaluation value related to the unloading regarding the risk of load damage. That is, when the determination result in step S206a is No, the control signal generator 116 determines whether or not a packet error rate acquired by the communication quality acquirer 112 is lower than 1% (step S224a). The packet error rate of 1% is equal to the packet error rate (1%) used as a reference for determining whether the packet error rate is good or bad in step S216a, but an arbitrary error rate may be used. If the packet error rate is lower than 1% (step S224a, Yes), the process proceeds to step S226a. If the packet error rate is 1% or more (step S224a, No), the process proceeds to step S228a.

The control signal generator 116 generates the first control signal indicating the load conveyance with the movement speed of 5 KM/H as in the first, control plan (step S226a).

The control signal generator 116 generates the second control signal indicating the load conveyance at a speed of 1 KM/H in which the moving speed of the first control plan is decreased (step S228a).

The control device 100 transmits the control signal generated in step S226a or step S228a to the control target device 150. When the control device 100 detects a completion of the execution of an operation corresponding to the control signal of the control target device 150, the process proceeds to step S232a.

The control signal generator 116 determines whether or not a packet error rate acquired by the communication quality acquirer 112 is lower than 10% (step S232a). Note that the packet error rate of 10% for determining high or low packet error rate is equal to the packet error rate (10%) used as a reference for determining good/bad or high/low packet error rate in step S208a, but may be an arbitrary error rate worse than the packet error rate (1%) used as a reference for determining good/bad or high/low packet error rate in step S224a. If the packet error rate is lower than 10% (step S232a, Yes), the process proceeds to step S234a. If the packet error rate is 10% or more (step S232a, No), the process proceeds to step S236a.

The control signal generator 116 generates the first control signal indicating unloading at the speed of 1 unit per minute (1/M) as in the second control plan (step S234a).

The control signal generator 116 generates the second control signal indicating unloading at a speed of 0.1 units per minute (0.1/M) in which the speed of the second control plan is decreased (step S236a).

As described above, in a case where a risk evaluation value related to load conveyance regarding a peripheral collision risk is lower than a risk evaluation value related to unloading regarding a risk of load damage, the control signal generator 116 generates the second control signal indicating the load conveyance in which the moving speed is decreased for the load conveyance when a packet error rate becomes worse than 10%, and generates the second control signal indicating the unloading in which the unloading speed is decreased for the unloading when the packet error rate becomes worse than 1%. In a case where the risk evaluation value related to the load conveyance regarding the peripheral collision risk is net lower than the risk evaluation value related to the unloading regarding the risk of load damage is not lower than the risk evaluation value, the control signal generator 116 generates the second control signal indicating the load conveyance in which the moving speed is decreased when the packet error rate becomes worse than 1% for the load conveyance, and generates the second control signal indicating unloading in which the unloading speed is decreased when the packet error rate becomes worse than 10% for the unloading.

In the above description, the communication quality used for determining whether the quality is good or bad is fixed to one type regardless of the type of the risk to be generated. Next, an example in which the communication quality to be used for determining whether the quality is good or bad is set according to the type of the risk of occurrence will be described.

When generating control signals for a plurality of different operations with different types of risks to be generated, the control signal generator 116 may determine whether or not to generate the second control signal for reducing a risk evaluation value using different types of the communication quality according to the types of risks.

That is, the control signal generator 116 generates a control signal for a first operation using a risk evaluation value of a first type of the risk and a first type of the communication quality, and generates a control signal for a second operation using a risk evaluation value of a second type of the risk and a second type of the communication quality.

As a result, it is possible to generate the second control signal for decreasing each risk evaluation value based on the communication quality more suitable for each operation, and it is possible to more efficiently perform the operation while reducing the risk due to the operation. A combination of a type of the risk, a type of the communication quality suitable for determining whether to reduce the risk, and a modification example when a control plan is changed based on the type of the risk and the type of the communication quality will be described.

A risk of collision with the surroundings due to a movement is affected by a fact that a communication is delayed and a control signal does not reach a control target device at necessary timing. Therefore, when a control signal for an operation that may cause a peripheral collision risk is generated, if a maximum value of the communication delay time is used as the communication quality, an operation to reduce the risk evaluation value can be realized. For example, in a case where the maximum value of the communication delay time is longer than a certain fixed time, the control signal generator 116 can reduce the risk evaluation value of the peripheral collision risk by changing a control plan to decrease a moving speed. Note that the movement may be a movement that changes coordinates of the control target device 150 itself, or may be a movement that changes some coordinates of a robot arm or the like included in the control target device 150.

A risk of collision with another target device due to a movement is considered to increase in a case where a control signal is not normally transmitted and each control target device 150 operates differently from the control plan. Therefore, when a packet error rate is used as the communication quality when generating a control signal of an operation that may cause a collision risk with another device, it is possible to realize an operation of reducing the risk evaluation value. For example, when the packet error rate is higher than a certain value, the control signal generator 116 can reduce the rick evaluation value of the collision risk with another device by changing the control plan to operate the control target device 150 at a certain distance or more from another control target device.

Regarding a risk of damaging a load in an operation of transporting the load, loading or unloading the load, for example, in a case where a control speed is unstable due to variations in the delay time of communication, a state of the load becomes unstable, and thus the risk evaluation value may increase. When a control signal for an operation of transporting a load, loading or unloading the load is generated, in a case where variation of communication delay time is used as the communication quality, it is possible to realize an operation of reducing the risk evaluation value. For example, the control signal generator 116 may change the control plan so that the acceleration becomes smaller than usual in a case where the variation in the communication delay becomes a certain level or more. In this way, it is possible to reduce the risk that the control speed becomes unstable and the load is damaged.

In a case where the control target device 150 performs an operation of moving to a place where radio waves are hard to reach, there is a possibility that the control target device cannot receive a control signal to perform, the operation thereby stopping, and being isolated. In such a case, when a communication disconnection probability is used as the communication quality, it is possible to realize an operation of reducing the risk evaluation value. For example, in a case where the communication disconnection probability is equal to or greater than a certain value, the control signal generator 116 may change the control plan to move the control target device 150 in another route while avoiding the place.

FIG. 22 illustrates an example of information stored in the risk evaluation value storage 114 in order to perform such processing. This information describes the communication quality information referred to by the control signal generator 116 for each operation type and risk type. The type of the risk that may occur varies depending on the type of each operation. On the other hand, the communication quality suitable for a certain type of the risk may be the same regardless of the type of operation, for example. In FIG. 22, as a description indicating this evaluation, "Hereinafter, the same applies regardless of operation." is described as a description for describing the communication quality suitable for a certain risk even in a case where an operation type is a type not described here. For example, from this information, it can be seen that, when conveying a load, the communication quality suitable for reducing a peripheral collision risk is a maximum value of the communication delay time, the communication quality suitable for reducing a collision risk with another device is a packet error rate, the communication quality suitable for reducing a risk of load damage is a variation of the communication delay time, the communication quality suitable for reducing a turnover risk is a variation of the communication delay time, the communication quality suitable for reducing a risk of incomplete operation is a communication disconnection probability, and the communication quality suitable for reducing a risk of isolation is a communication disconnection probability.

The information illustrated in FIG. 22 indicates one optimum communication quality to be referred to for each operation type and risk type when the control signal generator 116 generates a control signal, but the risk evaluation value storage 114 may store a plurality of communication qualities to be referred to for each operation type and risk type.

Although the operations of the control device 100 and the control target device 150 in the present embodiment have been described above, various modifications can be implemented and executed. Hereinafter, modifications applicable to the present embodiment will be described.

(First Modification)

As illustrated in FIG. 12, the control signal generator 116 changes a value of the communication quality as a criterion for determining whether to change a control plan to lower a risk evaluation value depending on whether the risk evaluation value is equal to or higher than a certain value or smaller than the certain value. However, as illustrated in FIG. 23, the risk evaluation value may be divided into three or more risk, evaluation, value ranges, and the communication quality serving as a criterion for determining whether or not to change the control plan to lower the risk evaluation value may be changed for each range.

For example, it is assumed that the risk evaluation value regarding operation is divided into three ranges. For an operation belonging to a risk evaluation value range having a high risk evaluation value, the control signal generator 116 may generate the first control signal when the communication quality is higher than a high-quality reference value, and may generate the second control signal for lowering the risk evaluation value when the communication quality is not higher than the high-quality reference value. For an operation belonging to a risk evaluation value range having a small risk evaluation value, the control signal generator 116 may generate the first control signal when the communication quality is higher than a low quality reference value and may generate the second control signal when the communication quality is not higher than the low quality reference value. For an operation belonging to a risk evaluation value range having a medium risk evaluation value, the control signal generator 116 may generate the first control signal when the communication quality is higher than a medium quality reference value, and may generate the second control signal when the communication quality is not higher than the medium quality reference value.

The modification of FIG. 23 is applicable not only to the first operation example but also to the second operation example and the third operation example.

FIG. 24 illustrates an example in which the control signals of FIG. 23 are modified as illustrated in FIG. 13. That is, the control signal generator 116 may generate the first control signal for the operation belonging to the risk evaluation value range in which the risk evaluation value is large when the communication quality is higher than the high quality reference value, and may generate a part C of the second control signal for lowering the risk evaluation value by a third predetermined value when the communication quality is not higher than the high quality reference value. For an operation belonging to a risk evaluation value range having a small risk evaluation value, the control signal generator 116 may generate the first control signal when the communication quality is higher than a low quality reference value, and may generate a part A of the second control signal for lowering the risk evaluation value by a first predetermined value when the communication quality is not higher than the low quality reference value. For an operation belonging to a risk evaluation value range having a medium risk evaluation value, the control signal generator 116 may generate the first control signal when the communication quality is higher than a medium quality reference value, and may generate a part B of the control signal for lowering the risk evaluation value by a second predetermined value in a case where the communication quality is not higher than the medium quality reference value.

The first predetermined value is higher than the second predetermined value. The second predetermined value is higher than the third predetermined value. That is, an operation instructed by the part A of the second control signal has a smaller risk evaluation value than a risk evaluation value of an operation instructed by the part B of the second control signal. An operation instructed by the part B of the second control signal has a smaller risk evaluation value than a risk evaluation value of an operation instructed by the part C of the second control signal.

The number of ranges for classifying the risk evaluation value is not limited to three, and may be four or more. In the examples of FIGS. 23 and 24, the reference value of the communication quality is changed stepwise according to the risk evaluation value, but the reference value of the communication quality may be continuously changed according to the risk evaluation value.

(Second Modification)

In both the control device 100 and the control target device 150, one wireless communication circuit and one antenna are illustrated, but a transmitter and a receiver may be separately provided, or a transmission antenna and a reception antenna may be separately provided.

(Third Modification)

In the present embodiment, the plurality of wireless resources for multiplexing and transmitting the control signals to the plurality of control target devices 150 has been described as the network slice logically configured in one wireless communication standard. The plurality of wireless resources may use different communication standards. For example, any combination of 4G and 5G, a cellular network and a wireless LAN, a wireless LAN and Bluetooth, and the like is possible. By using different communication standards for a plurality of wireless resources, at least one of time, frequency, space, and code can be made different.

(Fourth Modification)

Although the moving device such as the AGV has been described as the control target device 150, the example of the control target device 150 and the example of the operation thereof are not limited thereto. For example, controlling an electronic device or a system included in the control target device 150 is also included in the operation of the control target device 150.

Specifically, in a case where the control target device 150 includes a camera or the like as an electronic device, the operation of the control target device 150 includes control of a direction of the camera, a resolution of an image captured by the camera, a shutter speed of the camera, a frame rate, and the like. In addition to the camera, in a case where the control target device 150 includes a sensor as an electronic device, the operation of the control target device 150 includes control of a direction of the sensor, a physical quantity acquired by the sensor, a frequency of acquiring the physical quantity by the sensor, and the like. Furthermore, the operation of the control target device 150 includes control of a brake system that, controls a moving speed of the control target device 150, control of light, temperature, and the like by at least a part of the control target device 150, control of a transmission speed of data when the control target device transmits the data, and the like.

(Fifth Modification)

Functions performed by the components of the control device 100 may be realized by processing a program by a processing device similar to the processor 102. The processing device processes this program to implement each component included in the processor 102 described in FIG. 2. The program may be provided by being stored in a computer-readable storage medium such as a CD-ROM, a memory card, a CD-R, and a digital versatile disk (DVD) as a file in an installable format or an executable format. Furthermore, this program may be stored on a computer connected to a network such as the Internet and provided via the network, or may be provided by being incorporated in a storage medium such as a ROM, an HDD, or an SSD.

An example of the program is as follows.

A program for causing a computer of a control device that instructs at least one control of a control target device to execute a procedure of acquiring communication quality information of wireless communication between the control device and the control target device via wireless communication, a procedure of acquiring risk information indicating a degree of a risk that can be caused by the control, and a procedure of generating a control signal indicating at least one control based on the communication quality information and the risk information.

While certain embodiments have been described, these embodiments have been presented by way of example only, and are not intended to limit the scope of the inventions. Indeed, the novel embodiments described herein may be embodied in a variety of other forms; furthermore, various omissions, substitutions, and changes in the form of the embodiments described herein may be made without departing from the spirit of the inventions. The accompanying claims and their equivalents are intended to cover such forms or modifications as would fall within the scope and spirit of the inventions.

What is claimed is:

1. An electronic apparatus that instructs an operation of at least a part of a control target device via wireless communication, the electronic apparatus comprising:
a processor configured to:
determine a control plan instructing the operation of the at least the part of the control target device;
acquire communication quality information indicative of a communication quality of the wireless communication between the electronic apparatus and the control target device;
acquire risk information indicating a degree of a risk that can be caused by the operation of the at least the part of the control target device; and
perform at least one of (i) a determination as to whether or not to change the control plan, based on the communication quality information and the risk information, and (ii) a change of the control plan, based on the communication quality information and the risk information,
wherein the risk information comprises at least one of (i) first information taking into account a value of a material being conveyed by the control target device, (ii) second information taking into account a value of a periphery/surrounding area of the control target device, (iii) third information taking into account a value of the control target device, or (iv) fourth information taking into account a value of a delay of the operation of the at least the part of the control target device, and
wherein the processor is further configured to:
compare a risk evaluation value based on the risk information with a first evaluation value;
compare the communication quality with a first quality when the risk evaluation value is equal to or higher than the first evaluation value;
compare the communication quality with a second quality when the risk evaluation value is not equal to or not higher than the first evaluation value, the second quality being lower than the first quality; and
change the control plan to lower the risk evaluation value when the risk evaluation value is equal to or higher than the first evaluation value and the communication quality is not equal to or not higher than the first quality, or when the risk evaluation value is not equal to or not higher than the first evaluation value and the communication quality is not equal to or not higher than the second quality.

2. The electronic apparatus according to claim 1, wherein the processor is configured to change an acquisition method of the communication quality information based on the communication quality information.

3. The electronic apparatus according to claim 1, wherein the communication quality information includes information indicating at least one of a reception power, a signal power-to-noise power ratio, a signal power-to-interference power ratio, a communication distance, a packet error rate, a variation of a communication delay time, a maximum value of the communication delay time, and a communication disconnection probability.

4. The electronic apparatus according to claim 1, wherein the processor is configured to estimate the communication quality of the wireless communication by using the communication quality information.

5. The electronic apparatus according to claim 1, wherein:
the communication quality information is associated with at least one of a position and an orientation of the at least the part of the control target device, and
the processor is configured to estimate the communication quality of the wireless communication in at least one of a first position and a first direction of the at least the part of the control target device, by using the communication quality information associated with the at least one of the first position and the first direction.

6. The electronic apparatus according to claim 1, wherein the processor is configured to:
acquire an occurrence probability of the risk, and
perform at least one of (i) the determination as to whether or not to change the control plan, based on a risk evaluation value and the communication quality information, the risk evaluation value being based on the risk information and the occurrence probability of the risk, and (ii) the change of the control plan, based on the communication quality information and the risk information.

7. The electronic apparatus according to claim 1, wherein the processor is configured to:
change the control plan to lower the risk evaluation value by a first predetermined value when the risk evaluation value is not equal to or not higher than the first evaluation value and the communication quality is not equal to or not higher than the second quality; and
change the control plan to lower the risk evaluation value by a second predetermined value when the risk evaluation value is equal to or higher than the first evaluation value and the communication quality is not equal to or not higher than the first quality, the first predetermined value being larger than the second predetermined value.

8. The electronic apparatus according to claim 1, further comprising:
a wireless communication circuit configured to transmit a signal indicative of the control plan to the control target device via the wireless communication.

9. An electronic system comprising:
the electronic apparatus according to claim 1; and
the control target device.

10. An electronic apparatus that instructs an operation of at least a part of a control target device via wireless communication, the electronic apparatus comprising:
a processor configured to:
determine a control plan instructing the operation of the at least the part of the control target device;
acquire communication quality information indicative of a communication quality of the wireless communication between the electronic apparatus and the control target device;
acquire risk information indicating a degree of a risk that can be caused by the operation of the at least the part of the control target device; and
perform at least one of (i) a determination as to whether or not to change the control plan, based on the communication quality information and the risk information, and (ii) a change of the control plan, based on the communication quality information and the risk information,
wherein the risk information comprises at least one of (i) first information taking into account a value of a material being conveyed by the control target device, (ii) second information taking into account a value of a periphery/surrounding area of the control target device, (iii) third information taking into account a value of the control target device, or (iv) fourth information taking into account a value of a delay of the operation of the at least the part of the control target device, and wherein:

the operation includes a first operation and a second operation different from each other, and the processor is configured to:

determine a first control plan instructing the first operation;

determine a second control plan instructing the second operation;

compare a first risk evaluation value based on the risk information regarding the first operation with a second risk evaluation value based on the risk information regarding the second operation;

compare the communication quality with a second quality when the first risk evaluation value is lower than the second risk evaluation value;

change the first control plan to lower the first risk evaluation value when the communication quality is not equal to or higher than the second quality;

compare the communication quality with a first quality when the communication quality is equal to or higher than the second quality, the first quality being higher than the second quality;

change the second control plan to lower the second risk evaluation value when the communication quality is not equal to or not higher than the first quality;

compare the communication quality with a third quality when the first risk evaluation value is not lower than the second risk evaluation value;

change the first control plan to lower the first risk evaluation value when the communication quality is not equal to or not higher than the third quality;

compare the communication quality with a fourth quality when the communication quality is higher than the third quality, the fourth quality being higher than the third quality; and change the second control plan to lower the second risk evaluation value when the communication quality is not equal to or not higher than the fourth quality.

11. An electronic apparatus according to claim 1, that instructs an operation of at least a part of a control target device via wireless communication, the electronic apparatus comprising:

a processor configured to:

determine a control plan instructing the operation of the at least the part of the control target device;

acquire communication quality information indicative of a communication quality of the wireless communication between the electronic apparatus and the control target device;

acquire risk information indicating a degree of a risk that can be caused by the operation of the at least the part of the control target device; and perform at least one of (i) a determination as to whether or not to change the control plan, based on the communication quality information and the risk information, and (ii) a change of the control plan, based on the communication quality information and the risk information, wherein the risk information comprises at least one of (i) first information taking into account a value of a material being conveyed by the control target device, (ii) second information taking into account a value of a periphery/surrounding area of the control target device, (iii) third information taking into account a value of the control target device, or (iv) fourth information taking into account a value of a delay of the operation of the at least the part of the control target device, and wherein:

the operation includes a first operation and a second operation different from each other, and the processor is configured to:

determine a first control plan instructing the first operation;

determine a second control plan instructing the second operation;

compare a first risk evaluation value, which is based on the risk information and is indicative of a degree of a first risk that can be caused by the first operation, with a second risk evaluation value, which is based on the risk information and is indicative of a degree of a second risk that can be caused by the second operation;

compare the communication quality with a second quality when the first risk evaluation value is lower than the second risk evaluation value;

change the first control plan to lower the first risk evaluation value when the communication quality is not equal to or not higher than the second quality;

compare the communication quality with a first quality when the communication quality is equal to or higher than the second quality, the first quality being higher than the second quality;

change the second control plan to lower the second risk evaluation value when the communication quality is not equal to or not higher than the first quality;

compare the communication quality with a third quality when the first risk evaluation value is not lower than the second risk evaluation value;

change the first control plan to lower the first risk evaluation value when the communication quality is not equal to or not higher than the third quality;

compare the communication quality with a fourth quality when the communication quality is higher than the third quality, the fourth quality being lower than the third quality; and change the second control plan to lower the second risk evaluation value when the communication quality is not equal to or not higher than the fourth quality.

12. The electronic apparatus according to claim 11, wherein:

the first risk evaluation value is a maximum value among risk evaluation values indicative of degrees of risks that can be caused by the first operation; and the second risk evaluation value is a maximum value among risk evaluation values indicative of degrees of risks that can be caused by the second operation.

* * * * *